(12) United States Patent
Kilcoyne et al.

(10) Patent No.: US 12,330,211 B2
(45) Date of Patent: Jun. 17, 2025

(54) MULTI-DIAMETER WIRE FEEDER

(71) Applicant: Relativity Space, Inc., Long Beach, CA (US)

(72) Inventors: Scott Kilcoyne, Cambridge, MA (US); Mateo Pena Doll, Burlington, MA (US); Salvador Barriga, Burlington, MA (US)

(73) Assignee: Relativity Space, Inc., Long Beach, CA (US)

( * ) Notice: Subject to any disclaimer, the term of this patent is extended or adjusted under 35 U.S.C. 154(b) by 972 days.

(21) Appl. No.: 17/098,564

(22) Filed: Nov. 16, 2020

(65) Prior Publication Data
US 2021/0138538 A1 May 13, 2021

Related U.S. Application Data

(63) Continuation of application No. PCT/US2019/038052, filed on Jun. 19, 2019.
(Continued)

(51) Int. Cl.
*B22D 23/00* (2006.01)
*B23K 35/00* (2006.01)
(Continued)

(52) U.S. Cl.
CPC ........ *B22D 23/003* (2013.01); *B23K 35/0205* (2013.01); *B33Y 10/00* (2014.12); *B33Y 30/00* (2014.12); *B23K 35/00* (2013.01)

(58) Field of Classification Search
CPC .... B22D 23/0003; B33Y 10/00; B33Y 30/00; B23K 35/0205; B23K 35/00
See application file for complete search history.

(56) References Cited

U.S. PATENT DOCUMENTS

| | | | |
|---|---|---|---|
| 2,799,769 | A | 7/1957 | Vogel |
| 3,331,545 | A | 7/1967 | Olivieri |

(Continued)

FOREIGN PATENT DOCUMENTS

| | | | |
|---|---|---|---|
| CA | 2388130 A1 | 5/2001 |
| CA | 2398175 A1 | 8/2001 |

(Continued)

OTHER PUBLICATIONS

CN105690771A—translation (Year: 2023).*
(Continued)

*Primary Examiner* — Elizabeth M Kerr
*Assistant Examiner* — Keith Brian Assante
(74) *Attorney, Agent, or Firm* — KPPB LLP

(57) ABSTRACT

The present disclosure provides a system for printing a three-dimensional object. The system may comprise a support for holding a portion of the object and a wire(s) source configured to hold a wire(s) of substantially the same or different diameters. The system may also comprise a print head. The print head may comprise a guide for directing the wire to the support. The system may also comprise a driver roller comprising a groove configured to contact a portion of the wire and direct the wire to the guide, and a power source in electrical communication with the wire and the support. The system may also comprise a controller configured to direct the power source to supply electrical current to the wire and the support. The electrical current may be sufficient to melt the wire when the wire is in contact with the support or the portion of the object.

20 Claims, 12 Drawing Sheets

Related U.S. Application Data

(60) Provisional application No. 62/687,651, filed on Jun. 20, 2018.

(51) Int. Cl.
  *B23K 35/02* (2006.01)
  *B33Y 10/00* (2015.01)
  *B33Y 30/00* (2015.01)

(56) References Cited

U.S. PATENT DOCUMENTS

| | | | |
|---|---|---|---|
| 3,344,305 | A | 9/1967 | Ogden et al. |
| 3,447,730 | A | 6/1969 | Jeannette et al. |
| 3,555,235 | A | 1/1971 | Darrow et al. |
| 3,562,577 | A | 2/1971 | Kensrue |
| 3,694,620 | A | 9/1972 | Gleason |
| 3,934,482 | A | 1/1976 | Byers |
| 4,043,494 | A | 8/1977 | Bickford et al. |
| 4,047,656 | A | 9/1977 | Mccombs |
| 4,228,338 | A | 10/1980 | Cook et al. |
| 4,333,594 | A | 6/1982 | Cloos |
| 4,866,237 | A | 9/1989 | Inoue |
| 5,137,223 | A | 8/1992 | Brandon et al. |
| 5,736,188 | A | 4/1998 | Alcock et al. |
| 6,004,124 | A | 12/1999 | Swanson et al. |
| 6,335,511 | B1 | 1/2002 | Rothermel |
| 6,391,251 | B1 | 5/2002 | Keicher et al. |
| 6,443,352 | B1 | 9/2002 | White |
| 6,557,742 | B1 | 5/2003 | Bobeczko et al. |
| 6,568,578 | B1 | 5/2003 | Kensrue |
| 6,776,602 | B2 | 8/2004 | Swanson et al. |
| 6,910,360 | B2 * | 6/2005 | Stjepan ............... B21F 35/00 226/110 |
| 7,062,849 | B2 | 6/2006 | Ohashi et al. |
| 7,073,561 | B1 | 7/2006 | Henn et al. |
| 7,168,935 | B1 | 1/2007 | Taminger et al. |
| 7,169,337 | B2 | 1/2007 | Swanson et al. |
| 7,235,149 | B2 | 6/2007 | Taggart |
| 7,335,854 | B2 | 2/2008 | Hutchison |
| 7,384,255 | B2 | 6/2008 | Labossiere et al. |
| 7,700,893 | B2 | 4/2010 | Kaufman |
| 7,754,597 | B2 | 7/2010 | Toyoda |
| 7,896,209 | B2 | 3/2011 | Batchelder et al. |
| 7,897,074 | B2 | 3/2011 | Batchelder et al. |
| 8,308,876 | B2 | 11/2012 | Woods et al. |
| 8,487,184 | B2 | 7/2013 | Rivernider, Jr. et al. |
| 8,534,108 | B2 | 9/2013 | Austen |
| 8,647,102 | B2 | 2/2014 | Swanson et al. |
| 8,878,097 | B2 | 11/2014 | Enyedy et al. |
| 9,073,263 | B2 | 7/2015 | Mannella et al. |
| 9,102,099 | B1 | 8/2015 | Karpas et al. |
| 9,144,862 | B2 | 9/2015 | Hemmert et al. |
| 9,156,205 | B2 | 10/2015 | Mark et al. |
| 9,168,698 | B2 | 10/2015 | Kemperle et al. |
| 9,254,535 | B2 | 2/2016 | Buller et al. |
| 9,327,452 | B2 | 5/2016 | Mark et al. |
| 9,346,116 | B2 | 5/2016 | Guldberg |
| 9,399,264 | B2 | 7/2016 | Stecker et al. |
| 9,440,397 | B1 | 9/2016 | Fly et al. |
| 9,446,366 | B2 | 9/2016 | Makatsoris et al. |
| 9,457,514 | B2 | 10/2016 | Schwaerzler et al. |
| 9,481,931 | B2 | 11/2016 | Stempfer et al. |
| 9,616,494 | B2 | 4/2017 | Vader et al. |
| 9,724,877 | B2 | 8/2017 | Flitsch et al. |
| 9,764,517 | B2 | 9/2017 | Potter et al. |
| 9,784,111 | B2 | 10/2017 | Luo et al. |
| 9,789,652 | B2 | 10/2017 | Armstrong et al. |
| 9,821,399 | B1 | 11/2017 | Vigdal et al. |
| 9,833,839 | B2 | 12/2017 | Gibson et al. |
| 9,937,580 | B2 | 4/2018 | Peters et al. |
| 9,950,476 | B2 | 4/2018 | Nguyen et al. |
| 9,956,640 | B2 | 5/2018 | Burke et al. |
| 10,005,217 | B2 | 6/2018 | Williams et al. |
| 10,029,406 | B2 | 7/2018 | Burke et al. |
| 10,086,467 | B2 | 10/2018 | Burke et al. |
| 10,201,854 | B2 | 2/2019 | Sachs et al. |
| 10,232,443 | B2 | 3/2019 | Myerberg et al. |
| 10,254,499 | B1 * | 4/2019 | Cohen ............... B29C 64/321 |
| 10,272,492 | B2 | 4/2019 | Gibson et al. |
| 10,335,889 | B2 | 7/2019 | Burke et al. |
| 10,350,682 | B2 | 7/2019 | Myerberg et al. |
| 10,544,630 | B1 | 1/2020 | Avila et al. |
| 10,639,717 | B2 | 5/2020 | Fontana et al. |
| 2004/0179217 | A1 | 9/2004 | Chapman et al. |
| 2005/0017411 | A1 | 1/2005 | Yang et al. |
| 2005/0224486 | A1 | 10/2005 | Matiash |
| 2006/0070985 | A1 | 4/2006 | Nakabayashi |
| 2007/0158323 | A1 | 7/2007 | Enyedy et al. |
| 2008/0073330 | A1 | 3/2008 | Diedrick et al. |
| 2008/0156783 | A1 | 7/2008 | Vanden Heuvel et al. |
| 2009/0025208 | A1 | 1/2009 | Karrasch et al. |
| 2011/0111350 | A1 | 5/2011 | Lakshmi et al. |
| 2011/0150517 | A1 | 6/2011 | Chauvin et al. |
| 2011/0240607 | A1 | 10/2011 | Stecker et al. |
| 2011/0278175 | A1 | 11/2011 | Whitcombe et al. |
| 2011/0309063 | A1 | 12/2011 | Ott et al. |
| 2012/0160897 | A1 | 6/2012 | Enyedy |
| 2012/0164473 | A1 | 6/2012 | Taylor et al. |
| 2012/0247167 | A1 | 10/2012 | Austen |
| 2012/0325779 | A1 | 12/2012 | Yelistratov |
| 2014/0042129 | A1 | 2/2014 | Daniel et al. |
| 2014/0061165 | A1 | 3/2014 | Stempfer |
| 2014/0117575 | A1 | 5/2014 | Kemperle et al. |
| 2014/0242374 | A1 | 8/2014 | Strasser et al. |
| 2014/0374048 | A1 | 12/2014 | Kennedy et al. |
| 2014/0374935 | A1 | 12/2014 | Flitsch et al. |
| 2015/0021379 | A1 | 1/2015 | Albrecht et al. |
| 2015/0027239 | A1 | 1/2015 | Konkle |
| 2015/0093465 | A1 | 4/2015 | Page |
| 2015/0108095 | A1 | 4/2015 | Kruer et al. |
| 2015/0140147 | A1 | 5/2015 | Konstantinos et al. |
| 2015/0145169 | A1 | 5/2015 | Liu et al. |
| 2015/0209889 | A1 | 7/2015 | Peters et al. |
| 2015/0239178 | A1 | 8/2015 | Armstrong |
| 2015/0331402 | A1 | 11/2015 | Lin et al. |
| 2015/0352789 | A1 | 12/2015 | Haider et al. |
| 2016/0031159 | A1 | 2/2016 | Church et al. |
| 2016/0052208 | A1 | 2/2016 | Debora et al. |
| 2016/0057250 | A1 | 2/2016 | Sakai et al. |
| 2016/0096318 | A1 | 4/2016 | Bickel et al. |
| 2016/0167156 | A1 * | 6/2016 | Burke ............... B23K 11/309 219/76.12 |
| 2016/0193703 | A1 | 7/2016 | Kempers et al. |
| 2016/0200052 | A1 | 7/2016 | Moore et al. |
| 2016/0297104 | A1 | 10/2016 | Guillemette et al. |
| 2016/0318130 | A1 | 11/2016 | Stempfer et al. |
| 2016/0339633 | A1 | 11/2016 | Stolyarov et al. |
| 2017/0036399 | A1 | 2/2017 | Cheung |
| 2017/0050254 | A1 | 2/2017 | Holverson et al. |
| 2017/0050383 | A1 | 2/2017 | Bell et al. |
| 2017/0056970 | A1 | 3/2017 | Chin et al. |
| 2017/0087632 | A1 | 3/2017 | Mark |
| 2017/0089782 | A1 | 3/2017 | Hirt et al. |
| 2017/0120519 | A1 | 5/2017 | Mark |
| 2017/0129170 | A1 | 5/2017 | Kim et al. |
| 2017/0129171 | A1 | 5/2017 | Gardner et al. |
| 2017/0136567 | A1 | 5/2017 | Lahti et al. |
| 2017/0136579 | A1 | 5/2017 | Wagner et al. |
| 2017/0136587 | A1 | 5/2017 | Wagner et al. |
| 2017/0138409 | A1 | 5/2017 | Giese et al. |
| 2017/0144373 | A1 | 5/2017 | Erikson et al. |
| 2017/0152142 | A9 | 6/2017 | Kim et al. |
| 2017/0157826 | A1 | 6/2017 | Hishiki |
| 2017/0165781 | A1 | 6/2017 | Veldsman et al. |
| 2017/0165917 | A1 | 6/2017 | Mckiel |
| 2017/0173692 | A1 | 6/2017 | Myerberg et al. |
| 2017/0173693 | A1 | 6/2017 | Myerberg et al. |
| 2017/0173697 | A1 | 6/2017 | Myerberg et al. |
| 2017/0173877 | A1 | 6/2017 | Myerberg et al. |
| 2017/0203391 | A1 | 7/2017 | Budge |
| 2017/0210074 | A1 | 7/2017 | Ueda et al. |
| 2017/0220030 | A1 | 8/2017 | Grube et al. |
| 2017/0236639 | A1 | 8/2017 | Pieper et al. |
| 2017/0252808 | A1 | 9/2017 | Myerberg et al. |

(56) References Cited

U.S. PATENT DOCUMENTS

| | | |
|---|---|---|
| 2017/0252809 A1 | 9/2017 | Myerberg et al. |
| 2017/0252812 A1 | 9/2017 | Mykulowycz et al. |
| 2017/0252813 A1 | 9/2017 | Myerberg et al. |
| 2017/0252815 A1 | 9/2017 | Fontana et al. |
| 2017/0252820 A1 | 9/2017 | Myerberg et al. |
| 2017/0252823 A1 | 9/2017 | Sachs et al. |
| 2017/0252851 A1 | 9/2017 | Fulop et al. |
| 2017/0266876 A1 | 9/2017 | Hocker |
| 2017/0282283 A1 | 10/2017 | Burke et al. |
| 2017/0284876 A1 | 10/2017 | Moorlag et al. |
| 2017/0312967 A1 | 11/2017 | Williams |
| 2017/0320277 A1 | 11/2017 | Wang |
| 2017/0341306 A1 | 11/2017 | Burke et al. |
| 2018/0009052 A1 | 1/2018 | Struksnes et al. |
| 2018/0022027 A1 | 1/2018 | Powell |
| 2018/0050414 A1 | 2/2018 | Hughes |
| 2018/0071825 A1 | 3/2018 | Schmitt et al. |
| 2018/0126671 A1 | 5/2018 | Wilenski et al. |
| 2018/0154586 A1 | 6/2018 | Wang et al. |
| 2018/0159288 A1 | 6/2018 | Wright |
| 2018/0178314 A1 | 6/2018 | Maccormack et al. |
| 2018/0194068 A1 | 7/2018 | Burke et al. |
| 2018/0222119 A1 | 8/2018 | Burke et al. |
| 2018/0297272 A1 | 10/2018 | Preston et al. |
| 2018/0304370 A1 | 10/2018 | Myerberg et al. |
| 2018/0304530 A1 | 10/2018 | Nadvornik et al. |
| 2018/0311738 A1 | 11/2018 | Myerberg et al. |
| 2019/0001412 A1 | 1/2019 | Gibson et al. |
| 2019/0091933 A1 | 3/2019 | Barbati et al. |
| 2019/0118260 A1 | 4/2019 | Schmitt et al. |
| 2019/0210294 A1 | 7/2019 | Hudelson et al. |
| 2021/0053275 A1 | 2/2021 | Burke et al. |
| 2021/0138572 A1 | 5/2021 | Taig et al. |
| 2023/0398606 A1 | 12/2023 | Gruber et al. |
| 2024/0300010 A1 | 9/2024 | Kilcoyne et al. |

FOREIGN PATENT DOCUMENTS

| | | | |
|---|---|---|---|
| CA | 2487516 A1 | 12/2003 | |
| CA | 2849352 A1 | 3/2013 | |
| CA | 3101061 A1 | 12/2019 | |
| CH | 583605 A5 | 1/1977 | |
| CN | 101733521 A | 6/2010 | |
| CN | 104001918 A | 8/2014 | |
| CN | 204160773 U | 2/2015 | |
| CN | 105690771 A * | 6/2016 | ............. B33Y 30/00 |
| CN | 112480069 A | 3/2021 | |
| CN | 220259553 U | 12/2023 | |
| DE | 2515625 A1 | 10/1975 | |
| DE | 2537758 A1 | 3/1977 | |
| DE | 8126084 U1 | 3/1983 | |
| DE | 3922560 A1 | 1/1991 | |
| DE | 60021726 T2 | 9/2005 | |
| DE | 60304043 T2 | 5/2006 | |
| DE | 102019208732 A1 | 12/2019 | |
| EP | 2539100 A1 | 1/2013 | |
| EP | 2403757 B1 | 4/2014 | |
| EP | 3204223 A1 | 8/2017 | |
| EP | 3318359 A1 | 5/2018 | |
| EP | 3406385 A1 | 11/2018 | |
| EP | 3810402 A1 | 4/2021 | |
| EP | 4289540 A1 | 12/2023 | |
| GB | 1387113 A | 3/1975 | |
| GB | 1394291 A | 5/1975 | |
| GB | 2185821 A | 7/1987 | |
| GB | 2188728 A | 10/1987 | |
| GB | 2337332 A | 11/1999 | |
| GB | 2357281 A | 6/2001 | |
| GB | 2407154 A | 4/2005 | |
| GB | 2440209 A | 1/2008 | |
| GB | 2446880 A | 8/2008 | |
| GB | 2500487 A | 9/2013 | |
| GB | 2502298 A | 11/2013 | |
| GB | 2521996 A | 7/2015 | |
| GB | 2525187 A | 10/2015 | |
| GB | 2564711 A | 1/2019 | |
| GB | 2566752 A | 3/2019 | |
| GB | 2572589 A | 10/2019 | |
| GB | 2569673 B | 1/2020 | |
| GB | 2584704 A | 12/2020 | |
| GB | 2585235 A | 1/2021 | |
| GB | 2594948 A | 11/2021 | |
| GB | 2596293 A | 12/2021 | |
| GB | 2601784 A | 6/2022 | |
| IL | 109812 A | 11/1996 | |
| JP | S56168967 A | 12/1981 | |
| JP | S5853382 A | 3/1983 | |
| JP | S59223174 A | 12/1984 | |
| JP | S6021385 A | 2/1985 | |
| JP | 2015160217 A | 9/2015 | |
| JP | 2018503535 A | 2/2018 | |
| JP | 2021527582 A | 10/2021 | |
| KR | 101595282 B1 | 2/2016 | |
| KR | 101614860 B1 | 4/2016 | |
| WO | WO-9611117 A1 | 4/1996 | |
| WO | 2004070345 A2 | 8/2004 | |
| WO | 2005114329 A3 | 8/2006 | |
| WO | 2006123130 A1 | 11/2006 | |
| WO | 2006131726 A1 | 12/2006 | |
| WO | WO-2006133034 A1 | 12/2006 | |
| WO | 2007000583 A1 | 1/2007 | |
| WO | 2007107720 A2 | 9/2007 | |
| WO | 2008001071 A2 | 1/2008 | |
| WO | 2008068503 A2 | 6/2008 | |
| WO | 2009044177 A1 | 4/2009 | |
| WO | 2010041041 A1 | 4/2010 | |
| WO | 2011067563 A1 | 6/2011 | |
| WO | 2014111684 A1 | 7/2014 | |
| WO | 2015001315 A2 | 1/2015 | |
| WO | WO-2015180639 A1 | 12/2015 | |
| WO | WO-2016094660 A1 | 6/2016 | |
| WO | WO-2016162637 A1 | 10/2016 | |
| WO | 2017046553 A1 | 3/2017 | |
| WO | WO-2017073947 A1 * | 5/2017 | ............. B22F 3/105 |
| WO | WO-2017151837 A1 | 9/2017 | |
| WO | WO-2017152104 A2 | 9/2017 | |
| WO | WO-2017152133 A1 | 9/2017 | |
| WO | WO-2017152142 A1 | 9/2017 | |
| WO | WO-2017180314 A1 | 10/2017 | |
| WO | 2018154308 A1 | 8/2018 | |
| WO | WO-2018191728 A1 | 10/2018 | |
| WO | WO-2019055557 A1 | 3/2019 | |
| WO | WO-2019078974 A1 | 4/2019 | |
| WO | WO-2019079497 A1 | 4/2019 | |
| WO | WO-2019079737 A1 | 4/2019 | |
| WO | WO-2019079756 A1 | 4/2019 | |
| WO | WO-2019118914 A1 | 6/2019 | |
| WO | WO-2019133099 A1 | 7/2019 | |
| WO | WO-2019136222 A1 | 7/2019 | |
| WO | WO-2019157127 A1 | 8/2019 | |
| WO | WO-2019157253 A1 | 8/2019 | |
| WO | WO-2019157284 A1 | 8/2019 | |
| WO | WO-2019246253 A1 | 12/2019 | |
| WO | WO-2019246308 A1 | 12/2019 | |
| WO | 2020021229 A1 | 1/2020 | |
| WO | WO-2020033337 A1 | 2/2020 | |
| WO | 2020079424 A1 | 4/2020 | |
| WO | 2020183189 A1 | 9/2020 | |

OTHER PUBLICATIONS

WO 2017073947 A1—translation (Year: 2023).*
Co-pending U.S. Appl. No. 16/683,760, inventors McCarthykevin et al., filed Nov. 14, 2019.
Co-pending U.S. Appl. No. 16/860,809, inventors Barrigasalvador et al., filed Apr. 28, 2020.
Co-pending U.S. Appl. No. 16/933,637, inventors Mccallumduncan et al., filed Jul. 20, 2020.
Co-pending U.S. Appl. No. 16/983,686, inventors Burkepaul et al., filed Aug. 3, 2020.
Co-pending U.S. Appl. No. 17/169,158, inventors Taigelad et al., filed Feb. 5, 2021.

(56) References Cited

OTHER PUBLICATIONS

Co-pending U.S. Appl. No. 17/193,218, inventors Burkepaul et al., filed Mar. 5, 2021.
Copper Laminated Flexible Shunts. Bajeria industries, 2016. Retrieved copy: May 27, 2021; Available at: http://www.bajeria.com/copper-laminated-flexible-shunts.html.
European search report with written opinion dated Aug. 30, 2018 for EP Application No. 15867808.
International Search Report and Written Opinion dated Mar. 9, 2016 for International Application No. PCT/US2015/065003.
Notice of Allowance dated Jan. 25, 2018 for U.S. Appl. No. 15/619,401.
Notice of allowance dated Jun. 21, 2018 for U.S. Appl. No. 15/636,591.
Notice of Allowance dated Jan. 12, 2018 for U.S. Appl. No. 15/636,591.
Office action dated Oct. 18, 2018 for U.S. Appl. No. 15/941,375.
Office Action dated Nov. 17, 2017 for U.S. Appl. No. 15/636,591.
Office Action dated Jan. 3, 2018 for U.S. Appl. No. 14/965,275.
Office Action mailed Aug. 21, 2017 for U.S. Appl. No. 15/636,591.
Office Action mailed Sep. 22, 2017 for U.S. Appl. No. 15/619,401.
PCT/US2018/038052 International Search Report and Written Opinion dated Sep. 16, 2019.
PCT/US2019/022785 International Search Report and Written Opinion dated Jun. 25, 2019.
PCT/US2019/037971 International Search Report and Written Opinion dated Sep. 23, 2019.
PCT/US2019/045177 International Search Report and Written Opinion dated Dec. 6, 2019.
Sames et al., The metallurgy and processing science of metal additive manufacturing, International Materials Reviews, 61: 315-360 (2016).
U.S. Appl. No. 14/965,275 Notice of Allowance dated May 31, 2018.
U.S. Appl. No. 15/900,512 Office Action dated Feb. 6, 2020.
U.S. Appl. No. 15/941,375 Notice of Allowance dated Jan. 18, 2019.
U.S. Appl. No. 15/941,375 Office Action dated Jun. 14, 2018.
Extended European Search Report for European Application No. 19822308.3, Search completed May 19, 2022, Mailed Jun. 1, 2022, 32 Pgs.
Extended European Search Report for European Application No. 23178496.8, Search completed Oct. 12, 2023, Mailed Oct. 20, 2023, 09 Pgs.
International Preliminary Report on Patentability for International Application PCT/US2019/038052, Report issued Dec. 22, 2020, Mailed on Dec. 30, 2020, 8 Pgs.
International Search Report and Written Opinion for International Application No. PCT/US2019/038052, Search completed Aug. 20, 2019, Mailed Sep. 16, 2019, 9 pgs.
International Preliminary Report on Patentability for International Application PCT/US2019/037971, Report issued Dec. 22, 2022, Mailed on Dec. 30, 2020, 11 Pgs.

\* cited by examiner

MULTI-DIAMETER WIRE FEEDER

CROSS-REFERENCE

This application is a bypass continuation of International Patent Application No. PCT/US2019/038052, filed Jun. 19, 2019, which claims the benefit of U.S. Provisional Application No. 62/687,651, filed Jun. 20, 2018, each of which is entirely incorporated herein by reference.

BACKGROUND

Additive manufacturing techniques such as three-dimensional (3D) printing are rapidly being adopted as useful techniques for a host of different applications, including rapid prototyping and the fabrication of specialty components. To date, certain additive manufacturing processes have utilized polymeric materials in which polymeric material is pulled from a source into a nozzle, then melted, and subsequently deposited into a specified pattern in a layer-by-layer fashion to form a 3D object.

Existing technologies for the additive manufacture of metal structures may be performed by laser sintering or adhesive bonding followed by sintering. Such sintering technologies may use a bed of metal powder in a build area, and the powder particles are selectively joined to one another to form the desired pattern. When one layer is completed, more metal powder may be spread over the first layer, and powder particles may be joined to the previous layer in accordance with a pattern for that layer. The process may continue to build the desired structure in a layer-by-layer manner.

As a 3D printing approach, laser sintering may use a high power laser as the source of heat to fuse particles. Lasers have many safety risks, especially at the powers required for fusing metals.

Adhesive bonding may use glue to join adjacent powder particles instead of directly fusing the particles by laser energy, but the process may otherwise be similar. Glue may be selectively sprayed to form a pattern, and powder may be added in a layer-by-layer manner to form the structure. To make a mechanically sound metal part, the structure may be removed from the powder bed and placed in a furnace to sinter the bonded metal powders.

In molten-metal deposition techniques, heat to liquefy the metal may be derived from plasma or electric arc. The molten metal may then be sprayed in a pattern desired to form a structure by building layers as the metal cools.

SUMMARY

Recognized herein are various problems with current three-dimensional (3D) printing methods and systems. In certain powder-based metal 3D printing, for instance, the use of metal powder as a raw material can be problematic. Metal powder may be expensive to produce and may be more expensive than other feedstock (e.g., a wire) formed from the same material for the same amount of material. Metal powders may be difficult and dangerous to handle. For example, metal powder that is spilled may form dust in the air that is dangerous to inhale, and such dust may even be an explosion risk. In addition, the amount of powder required for conventional additive manufacturing technologies may be many times greater than that required to make the 3D object, as the entire build area may be filled with powder. This may increase the cost of the process and leads to attrition and waste of powder, which may not be readily reused. Conventional powder-based processes may also be slow because the spreading of concurrent layers of powder may need to be done precisely to the required layer thickness and may need to be done across the entire build area for each layer.

The present disclosure provides systems and methods for 3D printing using a feedstock (e.g., wire) that may help avoid various disadvantages of other 3D printing methods and systems. Methods and systems of the present disclosure enable a feedstock to be directed from a source of the feedstock to a print head (e.g., including a guide) for deposition in a manner that reduces stress(es) imposed on the feedstock. This may advantageously increase the longevity of various components of systems of the present disclosure.

The present disclosure provides rollers (e.g., driver rollers) that may permit a wire to be directed from a source (e.g., a wire spool) to a print head for deposition in a manner that reduces stress(es) on the wire while it is directed from the source to the print head. Such rollers may be used to direct multiple wires (e.g., wires having different sizes, diameters or cross-sectional dimensions) or wires of different materials during printing.

The present disclosure also provides improved grooves on the rollers that may permit a wire to be directed from a source to a print head for deposition in a manner that reduces stress(es) on the wire or portions of the driver rollers that are in contact with the wire while it is directed from the source to the print head.

In an aspect, the present disclosure provides a system for printing a three-dimensional (3D) object, comprising: (1) a wire source configured to hold a wire, which wire is usable for printing the 3D object; (2) a print head comprising a guide, which guide directs the wire from the wire source towards and in contact with a support or at least a portion of the 3D object adjacent to the support; (3) a driver roller, which the driver roller comprising a groove that is configured to (i) accept at least a portion of the wire and (ii) direct the at least the portion of the wire towards the guide; (4) a power source in electrical communication with the wire and the support, wherein the power source is configured to supply electrical current from the guide through the wire and to the support, or vice versa, during printing of the 3D object; and (5) a controller in electrical communication with the power source, wherein the controller is configured to direct the power source to supply the electrical current from the guide through the wire and to the support, or vice versa, during printing of the 3D object under conditions sufficient to melt the wire when the wire is in contact with the support or the at least the portion of the 3D object.

In some embodiments, the driver roller comprises at least one additional groove adjacent to the groove. In some embodiments, the driver roller comprises a position adjusting mechanism to move the driver roller into alignment with the wire. In some embodiments, the position adjusting mechanism is automated. In some embodiments, the positioning adjusting mechanism automatically moves the driver roller into alignment with the wire.

In some embodiments, the driver roller is connected to an electric motor for rotating the driver roller at a plurality of operating speeds. In some embodiments, the system further comprises a motor controller operatively coupled to the electric motor. In some embodiments, the motor controller is configured to accelerate, decelerate, maintain at a given speed of the plurality of operating speeds, or control direction of rotation of the electric motor.

In some embodiments, the groove is substantially U-shaped. In some embodiments, a radius of curvature of the groove is substantially the same as a radius of curvature of the wire. In some embodiments, the groove has a radius of curvature that deviates from a radius of curvature of the wire by at most 5%. In some embodiments, the groove has a radius of curvature that deviates from a radius of curvature of the wire by at most 50%.

In some embodiments, the groove has a concave shape corresponding to at least a vertex section of an ellipsoid or a vesica piscis. In some embodiments, the concave shape of the groove has two sides converging at a tip of the vertex section. In some embodiments, the two sides have a substantially identical radius of curvature that deviates from a radius of curvature of the wire by at most 5%. In some embodiments, the two sides have a substantially identical radius of curvature that deviates from a radius of curvature of the wire by at most 50%.

In some embodiments, the two sides of the groove is a continuation of at least two concave curves. In some embodiments, an inner curve of the at least two concave curves that is closer to a rotational axis of the driver roller has a smaller radius of curvature than an adjacent outer curve of the at least two concave curves.

In some embodiments, the system further comprises an assembly for directing the wire towards the guide. In some embodiments, the assembly comprises the driver roller and an additional roller. In some embodiments, the additional roller is configured to (i) contact at least a portion of the wire and (ii) direct the at least the portion of the wire into the groove of the driver roller of the assembly.

In some embodiments, the system further comprises a wire merger. In some embodiments, the wire merger comprises at least one entry orifice for receiving the wire from the assembly and an exit orifice for directing the wire towards the guide. In some embodiments, the assembly pushes the wire from the wire source towards the wire merger. In some embodiments, the assembly pulls the wire along a direction away from the wire merger towards the guide. In some embodiments, the system further comprises a conduit for providing a continuous passageway for the wire from the assembly to the at least one entry orifice of the wire merger. In some embodiments, the conduit is a flexible tube.

In some embodiments, the system further comprises a buffer idler disposed between the wire source and the assembly. In some embodiments, the buffer idler is configured to (i) contact at least a portion of the wire and (ii) direct the at least the portion of the wire towards the assembly.

In some embodiments, the wire merger comprises a converging configuration to provide a path for the wire from the at least one entry orifice to the exit orifice. In some embodiments, the converging configuration of the wire merger directs the wire from the at least one entry orifice into the exit orifice.

In some embodiments, the system further comprises at least one additional wire source to hold at least one additional wire. In some embodiments, the at least one additional wire is usable for the printing the 3D object.

In some embodiments, the guide of the print head comprises an opening. In some embodiments, the guide of the print head is a tip.

In some embodiments, the support holds the at least the portion of the 3D object during the printing. In some embodiments, the support is a platform.

In another aspect, the present disclosure provides a method for printing a three-dimensional (3D) object, comprising: (a) activating a 3D printing system, comprising: (i) a wire source configured to hold a wire, which wire is usable for the printing the 3D object; (ii) a print head comprising a guide, which guide directs the wire from the wire source towards and in contact with a support or at least a portion of the 3D object adjacent to the support; (iii) a driver roller, which the driver roller comprising a groove that is configured to (i) accept at least a portion of the wire and (ii) direct the at least the portion of the wire towards the guide; and (iv) a power source in electrical communication with the wire and the support, wherein the power source is configured to supply electrical current from the guide through the wire and to the support during the printing; (b) using the driver roller to direct the at least the portion of the wire towards the guide; and (c) directing the power source to supply the electrical current from the guide through the wire and to the support under conditions sufficient to melt the wire when the wire is in contact with the support or the at least the portion of the 3D object. In some embodiments, the support is a platform.

In some embodiments, the method further comprises detecting when the wire is in contact with the support or the at least the portion of the 3D object adjacent to the support. In some embodiments, the method further comprises directing the power source to supply the electrical current from the guide through the wire and to the support or the at least the portion of the 3D object adjacent to the support, or vice versa, when the wire is detected to be in contact with the support or the at least the portion of the 3D object.

In some embodiments, the method further comprises adjusting a force of contact between the wire and the support or the at least the portion of the 3D object adjacent to the support.

In some embodiments, the method further comprises activating an electric motor connected to the driver roller. In some embodiments, the method further comprises accelerating, decelerating, maintaining at a given speed of a plurality of operating speeds, or controlling direction of rotation of the electric motor.

In some embodiments, the driver roller comprises at least one additional groove adjacent to the groove. In some embodiments, the driver roller comprises a position adjusting mechanism to move the driver roller into alignment with the wire. In some embodiments, the position adjusting mechanism is automated. In some embodiments, the positioning adjusting mechanism automatically moves the driver roller into alignment with the wire.

In some embodiments, the driver roller is connected to an electric motor for rotating the driver roller at a plurality of operating speeds. In some embodiments, the electric motor is operatively coupled to a motor controller. In some embodiments, the motor controller is configured to accelerate, decelerate, maintain at a given speed of the plurality of operating speeds, or control direction of rotation of the electric motor.

In some embodiments, the groove is substantially U-shaped. In some embodiments, a radius of curvature of the groove is substantially the same as a radius of curvature of the wire. In some embodiments, the groove has a radius of curvature that deviates from a radius of curvature of the wire by at most 5%. In some embodiments, the groove has a radius of curvature that deviates from a radius of curvature of the wire by at most 50%.

In some embodiments, the groove has a concave shape corresponding to at least a vertex section of an ellipsoid or a vesica piscis. In some embodiments, the concave shape of the groove has two sides converging at a tip of the vertex section. In some embodiments, the two sides have a substantially identical radius of curvature that deviates from a radius of curvature of the wire by at most 5%.

In some embodiments, the two sides of the groove is a continuation of at least two concave curves. In some embodiments, an inner curve of the at least two concave curves that is closer to a rotational axis of the driver roller has a smaller radius of curvature than an adjacent outer curve of the at least two concave curves.

In some embodiments, the method further comprises using an assembly for directing the wire towards the guide. In some embodiments, the assembly comprises the driver roller and an additional roller. In some embodiments, the additional roller is configured to (i) contact at least a portion of the wire and (ii) direct the at least the portion of the wire into the groove of the driver roller of the assembly.

In some embodiments, the 3D printing system further comprises a wire merger. In some embodiments, the wire merger comprises at least one entry orifice for receiving the wire from the assembly and an exit orifice for directing the wire towards the guide. In some embodiments, the assembly pushes the wire from the wire source towards the wire merger. In some embodiments, the assembly pulls the wire along a direction away from the wire merger towards the guide. In some embodiments, the 3D printing system further comprises a conduit for providing a continuous passageway for the wire from the assembly to the at least one entry orifice of the wire merger. In some embodiments, the conduit is a flexible tube.

In some embodiments, the 3D printing system further comprises a buffer idler disposed between the wire source and the assembly. In some embodiments, the buffer idler is configured to (i) contact at least a portion of the wire and (ii) direct the at least the portion of the wire towards the assembly.

In some embodiments, the wire merger comprises a converging configuration to provide a path for the wire from the at least one entry orifice to the exit orifice. In some embodiments, the converging configuration of the wire merger directs the wire from the at least one entry orifice into the exit orifice.

In some embodiments, the 3D printing system further comprises at least one additional wire source to hold at least one additional wire. In some embodiments, the at least one additional wire is usable for the printing the 3D object.

In some embodiments, the guide of the print head comprises an opening. In some embodiments, the guide of the print head is a tip. In some embodiments, the support holds the at least the portion of the 3D object during the printing.

In another aspect, the present disclosure provides a system for forming a three-dimensional (3D) object, comprising: (a) a roller comprising a groove that is configured to support at least a portion of a wire; and (b) a controller that (i) directs the roller to bring the wire in contact with a support, and (ii) directs generation of heat from within the wire to melt the wire when the wire is in contact with the support, to form at least a portion of the 3D object. In some embodiments, the system further comprises a power supply in electrical communication with the wire and the support. In some embodiments, the controller directs the power supply to supply electrical current from the wire to the support, or vice versa, to generate the heat.

In another aspect, the present disclosure provides a method for forming a three-dimensional (3D) object, comprising: (a) providing a roller comprising a groove, which groove supports at least a portion of a wire; (b) using the roller to bring the wire in contact with a support; and (c) using heat from within the wire to melt the wire when the wire is in contact with the support, thereby forming at least a portion of the 3D object. In some embodiments, the method further comprises directing electrical current from the wire to the support, or vice versa, to generate the heat.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
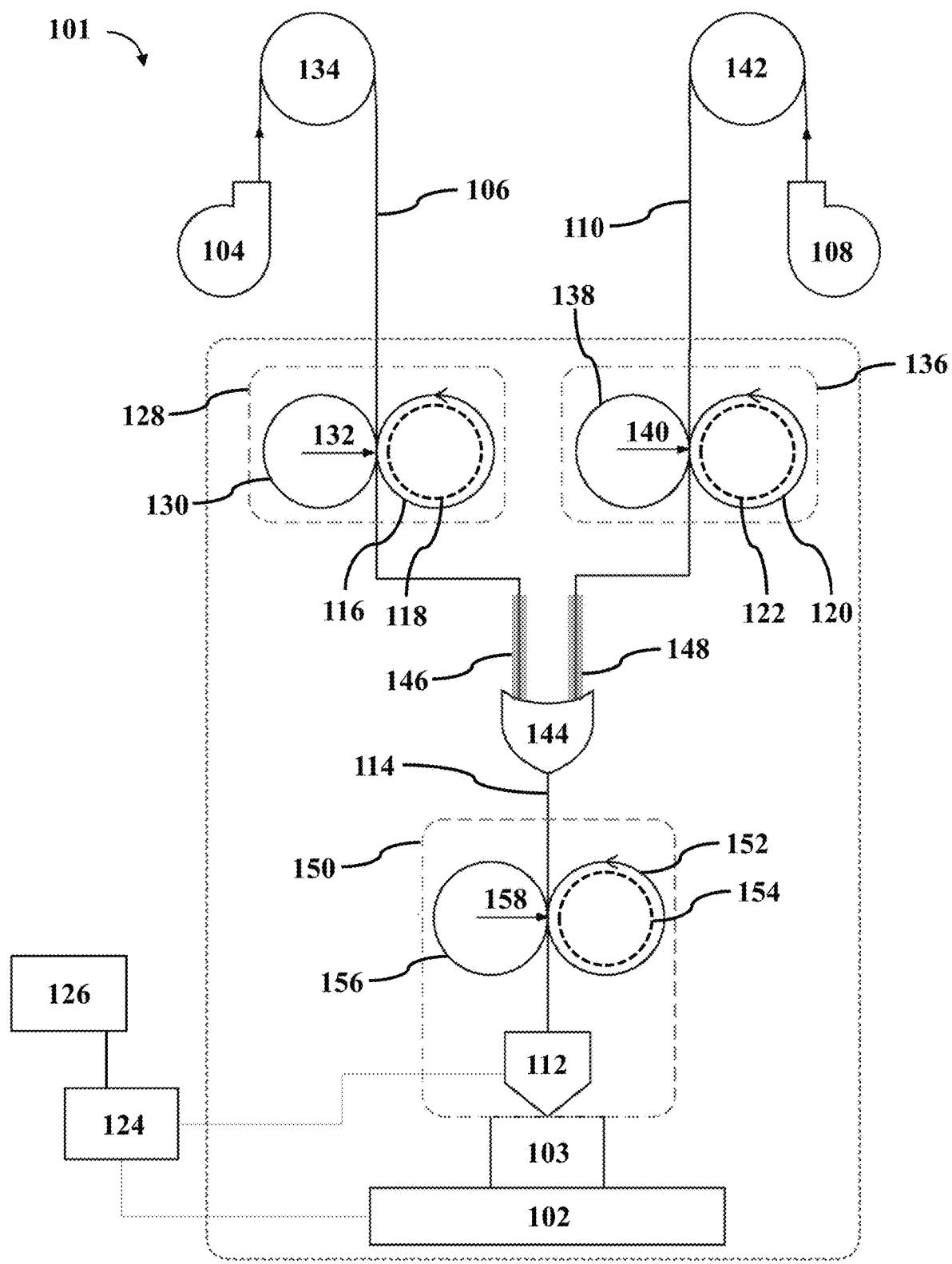
FIG. 1 schematically illustrates a three-dimensional printing system with multiple feedstocks.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. As used herein, the singular forms "a," "an," and "the" include plural references unless the context clearly dictates otherwise. Any reference to "or" herein is intended to encompass "and/or" unless otherwise stated.

The term "three-dimensional object" (also "3D object"), as used herein, generally refers to an object or a part that is printed by 3D printing. The 3D object may be at least a portion of a larger 3D object or an entirety of the 3D object.

The term "support," as used herein, generally refers to a structure that supports a nascent 3D object during printing and supports the 3D object after printing. The support may be a platform or an object that may not be a platform, such as another 3D object. The other object may be an object in need of repair or an object that is to be fused to another object (e.g., by a welding-type approach).

The term "roller", as used herein, generally refers to a part that may be in contact with a portion of a feedstock during printing. The roller may have various shapes and sizes. The roller may be circular, triangular, or square, for example. The roller may have at least one groove that is dimensioned to accommodate at least a portion of the feedstock.

The term "feedstock," as used herein, generally refers to a material that is usable alone or in combination with other material to print a 3D object. In some examples, the feedstock may be (i) a wire, ribbon or sheet, (ii) a plurality of wires, ribbons or sheets, or (iii) a combination of two or more of wires, ribbons and sheets (e.g., combination of wires and ribbons).

The term "guide" generally refers to a component in a print head that guides a feedstock towards a location on which a 3D object is to be printed, such as into a melt zone adjacent to a support. The melt zone may be on a support or at least a portion of a 3D object. The guide may be a nozzle or a tip, for example. The guide may permit the feedstock to pass towards and in contact with the support. The guide may include an opening, and during use, the feedstock may be directed in contact with the guide through the opening and towards the support. As an alternative, the guide may not include an opening, but may include a surface that comes in contact with the feedstock. The feedstock may slide through, over or under the guide of the print head into the melt zone. The guide may make a sliding contact with the feedstock and conduct electrical current to or from the feedstock. The guide may constrain the feedstock radially. A position of the guide relative to the melt zone may be constrained while the feedstock is moving through the guide towards the melt zone. The guide may come in contact with at least one feedstock. The guide may come in contact with, and in some cases constrain (e.g., radially constrain), at least 1, 2, 3, 4, 5, 6, 7, 8, 9, 10, or more feedstock simultaneously.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "at most", "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides methods and systems for forming a 3D object. The 3D object may be based on a computer model of the 3D object, such as a computer-aided design (CAD) stored in a non-transitory computer storage medium (e.g., medium). As an alternative, the 3D object may not be based on any computer model. In such scenario, methods and systems of the present disclosure may be used to, for example, deposit material on another object, couple one object to at least another object (e.g., welding at least two objects together), or cure a defect in an object (e.g., fill a hole or other defect).

Printing Systems

In an aspect, the present disclosure provides a system for printing a three-dimensional (3D) object. The system may comprise a support for holding at least a portion of the 3D object during the printing and a feedstock source configured to hold a feedstock. The feedstock may be usable for the printing the 3D object. The system may comprise a print head comprising a guide. The guide may comprise an opening for directing the feedstock from the feedstock source towards and in contact with the support or a portion of the three-dimensional object adjacent to the support. The system may include a driver roller. The driver roller may comprise a groove that is configured to (i) accept at least a portion of the feedstock and (ii) direct the at least the portion of the feedstock towards the guide. A power source may be in electrical communication with the feedstock and the support. The power source may be configured to supply electrical current to the feedstock and the support during the printing. A controller may be in communication with the power source. The controller may be configured to direct the power source to supply the electrical current to the feedstock and the support during the printing under conditions sufficient to melt the feedstock when the feedstock is in contact with the support or the portion of the three-dimensional object.

The 3D printing may be performed with at least 1, 2, 3, 4, 5, 6, 7, 8, 9, 10, or more feedstock. The 3D printing may be performed with at most 10, 9, 8, 7, 6, 5, 4, 3, 2, or less feedstock. The feedstock may be (i) a wire, ribbon or sheet, (ii) a plurality of wires, ribbons or sheets, or (iii) a combination of two or more of wires, ribbons and sheets (e.g., combination of wires and ribbons). The feedstock may have other form factors. If multiple feedstocks are used, the multiple feedstocks may be brought together to the opening. Alternatively or in addition to, at least some or each of the multiple feedstocks may be directed to the opening or different openings. A cross-sectional diameter of the feed stock may be at least about 0.01 millimeters (mm), 0.02 mm, 0.03 mm, 0.04 mm, 0.05 mm, 0.06 mm, 0.07 mm, 0.08 mm, 0.09 mm, 0.1 mm, 0.15 mm, 0.2 mm, 0.25 mm, 0.3 mm, 0.35 mm, 0.4 mm, 0.45 mm, 0.5 mm, 1.0 mm, 1.5 mm, 2.0 mm, 2.5 mm, 3.0 mm, 3.5 mm, 4.0 mm, 5 mm, 6 mm, 7 mm, 8 mm, 9 mm, 10 mm or greater. Alternatively, the cross-sectional diameter may be less than or equal to 10 mm, 9 mm, 8 mm, 7 mm, 6 mm, 5 mm, 4.0 mm, 3.5 mm, 3.0 mm, 2.5 mm, 2.0 mm, 1.5 mm, 1.0 mm, 0.5 mm, 0.45 mm, 0.4 mm, 0.35 mm, 0.3 mm, 0.25 mm, 0.2 mm, 0.15 mm, 0.1 mm, 0.09 mm, 0.08 mm, 0.07 mm, 0.06 mm, 0.05 mm, 0.04 mm, 0.03 mm, 0.02 mm, 0.01 mm or less.

The feedstock may be formed of at least one metal. In some examples, the feedstock comprises one or more metals selected from the group consisting of steel, stainless steel, iron, copper, gold, silver, cobalt, chromium, nickel, titanium, platinum, palladium, titanium, and aluminum. In some examples, the feedstock comprises one or more metals selected from the group consisting rare earths, alloys of metals, tool steel alloys, and nickel-based alloys. The feedstock may include at least one non-metal, such as a fiber material (e.g., elemental fiber or nanotube) and/or polymeric material. The fiber material may include, for example, carbon fiber, carbon nanotubes, and/or graphene. Alternatively, the feedstock may include at least one natural or synthetic ceramic material. The natural or synthetic ceramic material may be calcium phosphate, calcium carbonate, or silicate.

Segments of the feedstock may be printed on the support by melting a tip of the feedstock with an electric current. The electric current may flow from the guide of the print head through the feedstock and to the support, or vice versa. When the tip of the feedstock is in contact with the support, an electric circuit comprising the guide of the print head, the feedstock, the support, and a power source may be formed. The controller may be operatively coupled to the power source. In such electric circuit, the feedstock may be a first electrode, and the support may be a second electrode. If the feedstock is in physical contact with the support and the power source supplies the electrical current from the guide through the feedstock and to the support, or vice versa, the feedstock and the support are in electrical contact. In the electrical contact, there may be an electrical resistance between the feedstock and the support (i.e., contact resistance) due to a small surface area of the feedstock and microscopic imperfections on a surface of the tip of the feedstock and/or a surface of the support. The contact resistance between the tip of the feedstock and the support may heat a local area at the contact according to Equation 1 (i.e., Joule's First Law):

$$Q = I^2 \cdot R \cdot t \quad \text{(Equation 1)}$$

where Q is the heat generated at the local area at the contact,

I is the electric current,

R is the contact resistance between the feedstock and the support, and t is a duration of an application of the current.

The heat generated at the local area at the contact between the feedstock and the support may be sufficient to melt the tip of the feedstock into a segment and to fuse the segment to the support. The heat may be generated by resistive heating (e.g., Joule heating). In some examples, the segment is a strand or a particle, which strand or particle may be molten. Upon deposition of the segment on the support, the segment may act as a second electrode in the electric circuit to melt and print additional segments of the feedstock. The heat generated at the local area may be sufficient to melt the tip of the feedstock into a segment and to fuse the segment to a segment on the support. The heat generated at the local area may be sufficient to melt the tip of the feedstock into a segment and to fuse the segment to one or more neighboring segments. As such, segments of the feedstock may be deposited without use or generation of electric arcs and/or plasma, but rather by utilizing energy (e.g., electrical energy) within the feedstock. The energy within the feedstock may be to (i) melt at least a portion of the feedstock and (ii) print and/or repair at least a portion of the 3D object.

The tip of the feedstock may melt while the feedstock is in contact with the support and the feedstock and the support are moving relative to one another. For example, the feedstock is moving and the support is stationary. As another example, the feedstock is stationary and the support is moving (e.g., along a plane orthogonal to a longitudinal axis of the support perpendicular to the support). As another example, both the feedstock and the support are moving (e.g., along a plane orthogonal to a longitudinal axis of the support perpendicular to the support).

The support may be printing platform. As an alternative, the support may be a previously deposited layer, such as a previously deposited layer of the three-dimensional object or a previously deposited sacrificial layer(s). As another alternative, the support is a part (e.g., part formed by 3D printing or other approaches) and the feedstock is deposited on the part.

The heat (or temperature) generated at the local area at the contact between the feedstock (e.g., a wire) and the support may be at least 100 degrees Celsius (° C.), 200° C., 300° C., 400° C., 500° C., 600° C., 700° C., 800° C., 900° C., 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., 3000° C., 3100° C., 3200° C., 3300° C., 3400° C., 3500° C., 3600° C., 3700° C., 3800° C., 3900° C., 4000° C., 5000° C. or more. The heat generated at the local area at the contact between the feedstock and the support may be at most 5000° C., 4000° C., 3900° C., 3800° C., 3700° C., 3600° C., 3500° C., 3400° C., 3300° C., 3200° C., 3100° C., 3000° C., 2900° C., 2800° C., 2700° C., 2600° C., 2500° C., 2400° C., 2300° C., 2200° C., 2100° C., 2000° C., 1900° C., 1800° C., 1700° C., 1600° C., 1500° C., 1400° C., 1300° C., 1200° C., 1100° C., 1000° C., 900° C., 800° C., 700° C., 600° C., 500° C., 400° C., 300° C., 200° C., 100° C., or less.

In some cases, the heat generated at the local area at the contact between the feedstock and the support may not vary depending on a material of the feedstock (e.g., the wire). Alternatively, the heat generated at the local area at the contact between the feedstock and the support may vary depending on the material of the feedstock. In some examples, the heat may be at least about 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1110° C., 1120° C., 1130° C., 1140° C., 1150° C., 1160° C., 1170° C., 1180° C., 1190° C., 1200° C., 1210° C., 1220° C., 1230° C., 1240° C., 1250° C., 1260° C., 1270° C., 1280° C., 1290° C., 1300° C., or more when the feedstock comprises aluminum or alloys. The heat may be at most 1300° C., 1290° C., 1280° C., 1270° C., 1260° C., 1250° C., 1240° C., 1230° C., 1220° C., 1210° C., 1200° C., 1190° C., 1180° C., 1170° C., 1160° C., 1150° C., 1140° C., 1130° C., 1120°

C., 1110° C., 1100° C., 1090° C., 1080° C., 1070° C., 1060° C., 1050° C., 1040° C., 1030° C., 1020° C., 1010° C., 1000° C., 990° C., 980° C., 970° C., 960° C., 950° C., 940° C., 930° C., 920° C., 910° C., 900° C., 890° C., 880° C., 870° C., 860° C., 850° C., 840° C., 830° C., 820° C., 810° C., 800° C., 790° C., 780° C., 770° C., 760° C., 750° C., 740° C., 730° C., 720° C., 710° C., 700° C., 690° C., 680° C., 670° C., 660° C., 650° C., 640° C., 630° C., 620° C., 610° C., 600° C., 590° C., 580° C., 570° C., 560° C., 550° C., 540° C., 530° C., 520° C., 510° C., 500° C., 490° C., 580° C., 470° C., 460° C., 450° C., 440° C., 430° C., 420° C., 410° C., 400° C., or less when the feedstock comprises aluminum or alloys.

In some examples, the heat may be at least 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1010° C., 1020° C., 1030° C., 1040° C., 1050° C., 1060° C., 100° C., 1080° C., 1090° C., 1100° C., 1110° C., 1120° C., 1130° C., 1140° C., 1150° C., 1160° C., 1170° C., 1180° C., 1190° C., 1200° C., 1210° C., 1220° C., 1230° C., 1240° C., 1250° C., 1260° C., 1270° C., 1280° C., 1290° C., 1300° C., 1310° C., 1320° C., 1330° C., 1340° C., 1350° C., 1360° C., 1370° C., 1380° C., 1390° C., 1400° C., 1410° C., 1420° C., 1430° C., 1440° C., 1450° C., 1460° C., 1470° C., 1480° C., 1490° C., 1500° C., 1510° C., 1520° C., 1530° C., 1540° C., 1550° C., 1560° C., 1570° C., 1580° C., 1590° C., 1600° C., or more when the feedstock comprises copper or alloys. The heat may be at most 1600° C., 1590° C., 1580° C., 1570° C., 1560° C., 1550° C., 1540° C., 1530° C., 1520° C., 1510° C., 1500° C., 1490° C., 1480° C., 1470° C., 1460° C., 1450° C., 1440° C., 1430° C., 1420° C., 1410° C., 1400° C., 1390° C., 1380° C., 1370° C., 1360° C., 1350° C., 1340° C., 1330° C., 1320° C., 1310° C., 1300° C., 1290° C., 1280° C., 1270° C., 1260° C., 1250° C., 1240° C., 1230° C., 1220° C., 1210° C., 1200° C., 1190° C., 1180° C., 1170° C., 1160° C., 1150° C., 1140° C., 1130° C., 1120° C., 1110° C., 1100° C., 1090° C., 1080° C., 1070° C., 1060° C., 1050° C., 1040° C., 1030° C., 1020° C., 1010° C., 1000° C., 990° C., 980° C., 970° C., 960° C., 950° C., 940° C., 930° C., 920° C., 910° C., 900° C., 890° C., 880° C., 870° C., 860° C., 850° C., 840° C., 830° C., 820° C., 810° C., 800° C., or less when the feedstock comprises copper or alloys.

In some examples, the heat may be at least 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1010° C., 1020° C., 1030° C., 1040° C., 1050° C., 1060° C., 1070° C., 1080° C., 1090° C., 1100° C., 1110° C., 1120° C., 1130° C., 1140° C., 1150° C., 1160° C., 1170° C., 1180° C., 1190° C., 1200° C., 1210° C., 1220° C., 1230° C., 1240° C., 1250° C., 1260° C., 1270° C., 1280° C., 1290° C., 1300° C., 1310° C., 1320° C., 1330° C., 1340° C., 1350° C., 1360° C., 1370° C., 1380° C., 1390° C., 1400° C., 1410° C., 1420° C., 1430° C., 1440° C., 1450° C., 1460° C., 1470° C., 1480° C., 1490° C., 1500° C., 1510° C., 1520° C., 1530° C., 1540° C., 1550° C., 1560° C., 1570° C., 1580° C., 1590° C., 1600° C., or more when the feedstock comprises gold or alloys. The heat may be at most 1600° C., 1590° C., 1580° C., 1570° C., 1560° C., 1550° C., 1540° C., 1530° C., 1520° C., 1510° C., 1500° C., 1490° C., 1480° C., 1470° C., 1460° C., 1450° C., 1440° C., 1430° C., 1420° C., 1410° C., 1400° C., 1390° C., 1380° C., 1370° C., 1360° C., 1350° C., 1340° C., 1330° C., 1320° C., 1310° C., 1300° C., 1290° C., 1280° C., 1270° C., 1260° C., 1250° C., 1240° C., 1230° C., 1220° C., 1210° C., 1200° C., 1190° C., 1180° C., 1170° C., 1160° C., 1150° C., 1140° C., 1130° C., 1120° C., 1110° C., 1100° C., 1090° C., 1080° C., 1070° C., 1060° C., 1050° C., 1040° C., 1030° C., 1020° C., 1010° C., 1000° C., 990° C., 980° C., 970° C., 960° C., 950° C., 940° C., 930° C., 920° C., 910° C., 900° C., 890° C., 880° C., 870° C., 860° C., 850° C., 840° C., 830° C., 820° C., 810° C., 800° C., or less when the feedstock comprises gold or alloys.

In some examples, the heat may be at least 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1050° C., 1100° C., 1150° C., 1200° C., 12050° C., 1300° C., 1350° C., 1400° C., 1450° C., 1500° C., 1550° C., 1600° C., 1650° C., 1700° C., 1750° C., 1800° C., 1850° C., 1900° C., 1950° C., 2000° C., 2050° C., 2100° C., 2150° C., 2200° C., 2250° C., 2300° C., 2350° C., 2400° C., 2450° C., 2500° C., or more when the feedstock comprises iron or alloys. The heat may be at most 2500° C., 2450° C., 2400° C., 2350° C., 2300° C., 2250° C., 2200° C., 2150° C., 2100° C., 2050° C., 2000° C., 1900° C., 1800° C., 1700° C., 1600° C., 1500° C., 1400° C., 1300° C., 1200° C., 1100° C., 1000° C., 990° C., 980° C., 970° C., 960° C., 950° C., 940° C., 930° C., 920° C., 910° C., 900° C., 890° C., 880° C., 870° C., 860° C., 850° C., 840° C., 830° C., 820° C., 810° C., 800° C., or less when the feedstock comprises iron or alloys.

In some examples, the heat may be at least 1500° C., 1510° C., 1520° C., 1530° C., 1540° C., 1550° C., 1560° C., 1570° C., 1580° C., 1590° C., 1600° C., 1610° C., 1620° C., 1630° C., 1640° C., 1650° C., 1660° C., 1670° C., 1680° C., 1690° C., 1700° C., 1710° C., 1720° C., 1730° C., 1740° C., 1750° C., 1760° C., 1770° C., 1780° C., 1790° C., 1800° C., 1850° C., 1900° C., 1950° C., 2000° C., 2050° C., 2100° C., 2150° C., 2200° C., 2250° C., 2300° C., or more when the feedstock comprises platinum or alloys. The heat may be at most 2300° C., 2250° C., 2200° C., 2150° C., 2100° C., 2050° C., 2000° C., 1950° C., 1900° C., 1850° C., 1800° C., 1790° C., 1780° C., 1770° C., 1760° C., 1750° C., 1740° C., 1730° C., 1720° C., 1710° C., 1700° C., 1690° C., 1680° C., 1670° C., 1660° C., 1650° C., 1640° C., 1630° C., 1620° C., 1610° C., 1600° C., 1590° C., 1580° C., 1570° C., 1560° C., 1550° C., 1540° C., 1530° C., 1520° C., 1510° C., 1500° C., or less when the feedstock comprises platinum or alloys.

In some examples, the heat may be at least 1200° C., 1210° C., 1220° C., 1230° C., 1240° C., 1250° C., 1260° C., 1270° C., 1280° C., 1290° C., 1300° C., 1310° C., 1320° C., 1330° C., 1340° C., 1350° C., 1360° C., 1370° C., 1380° C., 1390° C., 1400° C., 1410° C., 1420° C., 1430° C., 1440° C., 1450° C., 1460° C., 1470° C., 1480° C., 1490° C., 1500° C., 1510° C., 1520° C., 1530° C., 1540° C., 1550° C., 1560° C., 1570° C., 1580° C., 1590° C., 1600° C., 1650° C., 1700° C., 1750° C., 1800° C., 1850° C., 1900° C., 1950° C., 2000° C., 2050° C., 2100° C., or more when the feedstock comprises steel (e.g., carbon steel, stainless steel, etc.). The heat may be at most 2100° C., 2050° C., 2000° C., 1950° C., 1900° C., 1850° C., 1800° C., 1750° C., 1700° C., 1650° C., 1600° C., 1590° C., 1580° C., 1570° C., 1560° C., 1550° C., 1540° C., 1530° C., 1520° C., 1510° C., 1500° C., 1490° C., 1480° C., 1470° C., 1460° C., 1450° C., 1440° C., 1430° C., 1420° C., 1410° C., 1400° C., 1390° C., 1380° C., 1370° C., 1360° C., 1350° C., 1340° C., 1330° C., 1320° C., 1310° C., 1300° C., 1290° C., 1280° C., 1270° C., 1260° C., 1250° C., 1240° C., 1230° C., 1220° C., 1210° C., 1200° C., or less when the feedstock comprises steel.

In some embodiments, based at least in part on a type or composition of the alloy, the melting point of the alloy may be lower than a melting temperature of one or more base metals of the alloy. Alternatively, based at least in part on a type or composition of the alloy, the melting point of the alloy may be higher than the melting temperature of the one or more base metals of the alloy. In another alternative, based at least in part on a type or composition of the alloy, the melting point of the alloy may be about the same as the melting temperature of the one or more base metals of the alloy. In some embodiments, the feedstock (e.g. a wire) may superheat at a melt pool.

The electric current from the guide to the feedstock and to the support, or vice versa, may range from about 10 Amperes (A) to about 20000 A. The electric current may be at least about 10 A, 20 A, 30 A, 40 A, 50 A, 60 A, 70 A, 80 A, 90 A, 100 A, 200 A, 300 A, 400 A, 500 A, 600 A, 700 A, 800 A, 900 A, 1000 A, 2000 A, 3000 A, 4000 A, 5000 A, 6000 A, 7000 A, 8000 A, 9000 A, 10000 A, 20000 A or more. The electric current may be at most about 20000 A, 10000 A, 9000 A, 8000 A, 7000 A, 6000 A, 5000 A, 4000 A, 3000 A, 2000 A, 1000 A, 900 A, 800 A, 700 A, 600 A, 500 A, 400 A, 300 A, 200 A, 100 A, 90 A, 80 A, 70 A, 60 A, 50 A, 40 A, 30 A, 20 A, 10 A or less. The duration of the application of the current may range from about 0.01 seconds (s) to about 1 s. The duration of the application of the current may be at least about 0.01 s, 0.02 s, 0.03 s, 0.04 s, 0.05 s, 0.06 s, 0.07 s, 0.08 s, 0.09 s, 0.1 s, 0.2 s, 0.3 s, 0.4 s, 0.5 s, 0.6 s, 0.7 s, 0.8 s, 0.9 s, 1 s or more. The duration of the application of the current may be at most about 1 s, 0.9 s, 0.8 s, 0.7 s, 0.6 s, 0.5 s, 0.4 s, 0.3 s, 0.2 s, 0.1 s, 0.09 s, 0.08 s, 0.07 s, 0.06 s, 0.05 s, 0.04 s, 0.03 s, 0.02 s, 0.01 s or less.

The material for the support may be selected for good electrical conductivity and compatibility with the feedstock that is being deposited as segments. The support may be non-consumable and thus need not be replaced during normal operation. Alternatively or in addition to, the support may be replaced after printing one or more 3D objects. The support may be chosen to allow weak adhesion of the deposited segments to it, so that a first layer of deposited segments may hold the at least the portion of the 3D object firmly in place on the support during further deposition. The material for the support may have a higher electrical conductivity than the feedstock. The material for the support may not alloy with the feedstock. The material for the support may have a higher thermal conductivity than the feedstock, such that heat generated at an area of the feedstock deposition may be quickly conducted away. For example, if the deposited metal is steel, copper or aluminum may be appropriate materials for the support. The material for the support may have a lower electrical conductivity than the feedstock.

The application of electric current may be controlled to influence the deposition of segments (e.g., size, shape, etc.). An open-loop control of the electric current may be enabled via choosing a desired intensity level and/or duration of power prior to the deposition of segments. The desired intensity level and/or duration of power may be assigned on the power source or the controller operatively coupled to the power source. The desired intensity level of the power may be calibrated to achieve a specific voltage or current at a constant contact resistance between the feedstock and the support. Alternatively or in addition to, a closed-loop control may be used. The closed-loop control may comprise an electrical measurement meter (e.g., a voltmeter, ammeter, potentiometer, etc.) electrically coupled to the guide of the print head, the feedstock, the support, the power source, and/or the controller operatively coupled to the power source. In the closed-loop control, voltage and current to the tip of the feedstock may be measured in situ during deposition of the segments, and the contact resistance between the feedstock and the support may be calculated according to Equation 2 (i.e., Ohm's Law):

$$R = \frac{V}{I} \quad \text{(Equation 2)}$$

where V is the voltage,
I is the electric current, and
R is the contact resistance between the feedstock and the support.

The closed-loop control may beneficially eliminate failed parts due to incomplete fusion of segments and minimize heat input into the structure during deposition.

Because the contact resistance is calculated dynamically, the power of the applied electric current may be precisely controlled, thus resulting in an exact amount of heat being applied during deposition of a segment from the feedstock. The power source may supply an alternating current (AC) or a direct current (DC) to the feedstock and/or the support. The AC may range from about 1 millivolt (mV) to about 100 volt (V). The AC may be about at least about 1 mV, 2 mV, 3 mV, 4 mV, 5 mV, 6 mV, 7 mV, 8 mV, 9 mV, 10 mV, 20 mV, 30 mV, 40 mV, 50 mV, 60 mV, 70 mV, 80 mV, 90 mV, 100 mV, 200 mV, 300 mV, 400 mV, 500 mV, 600 mV, 700 mV, 800 mV, 900 mV, 1 V, 2 V, 3 V, 4 V, 5 V, 6 V, 7 V, 8 V, 9 V, 10 V, 20 V, 30 V, 40 V, 50 V, 60 V, 70 V, 80 V, 90 V, 100 V, or more. The AC may be at most about 100 V, 90 V, 80 V, 70 V, 60 V, 50 V, 40 V, 30 V, 20 V, 10 V, 9 V, 8 V, 7 V, 6 V, 5 V, 4 V, 3 V, 2 V, 1 V, 900 mV, 800 mV, 700 mV, 600 mV, 500 mV, 400 mV, 300 mV, 200 mV, 100 mV, 90 mV, 80 mV, 70 mV, 60 mV, 50 mV, 40 mV, 30 mV, 20 mV, 10 mV, 9 mV, 8 mV, 7 mV, 6 mV, 5 mV, 4 mV, 3 mV, 2 mV, 1 mV or less. The DC may range from about 1 mV to 100 V. The DC may be about at least about 1 mV, 2 mV, 3 mV, 4 mV, 5 mV, 6 mV, 7 mV, 8 mV, 9 mV, 10 mV, 20 mV, 30 mV, 40 mV, 50 mV, 60 mV, 70 mV, 80 mV, 90 mV, 100 mV, 200 mV, 300 mV, 400 mV, 500 mV, 600 mV, 700 mV, 800 mV, 900 mV, 1 V, 2 V, 3 V, 4 V, 5 V, 6 V, 7 V, 8 V, 9 V, 10 V, 20 V, 30 V, 40 V, 50 V, 60 V, 70 V, 80 V, 90 V, 100 V, or more. The DC may be at most about 100 V, 90 V, 80 V, 70 V, 60 V, 50 V, 40 V, 30 V, 20 V, 10 V, 9 V, 8 V, 7 V, 6 V, 5 V, 4 V, 3 V, 2 V, 1 V, 900 mV, 800 mV, 700 mV, 600 mV, 500 mV, 400 mV, 300 mV, 200 mV, 100 mV, 90 mV, 80 mV, 70 mV, 60 mV, 50 mV, 40 mV, 30 mV, 20 mV, 10 mV, 9 mV, 8 mV, 7 mV, 6 mV, 5 mV, 4 mV, 3 mV, 2 mV, 1 mV or less.

In some examples, one pole of the power source is attached to the feedstock (e.g., through a guide of the print head) and another pole of the power source is attached to the support.

The driver roller may include at least 1, 2, 3, 4, 5, 6, 7, 8, 9, 10, or more grooves. If the driver roller includes multiple grooves, the grooves may be vertically stacked in relation to one another or arranged in a parallel configuration. In some examples, the driver roller includes at least one additional groove adjacent to the groove. The at least one additional groove may be arranged in a parallel fashion to the groove. The at least one additional groove may be configured to (i) accept at least a portion of at least one additional feedstock and (ii) direct the at least the portion of the at least the additional feedstock towards the guide. The driver roller comprising the groove and at least the additional groove may simultaneously direct the feedstock and the at least the additional feedstock along a direction towards the guide.

In some examples, the driver roller comprising the at least one additional groove simultaneously directs the feedstock and the at least one additional feedstock along a direction away from the guide.

The driver roller with multiple grooves may have grooves that are arranged equidistantly from each other. Alternatively, the grooves may be arranged on the driver roller with different spacings. For example, if the driver roller has three grooves, a distance between a first groove and a second groove that is arranged directly adjacent to the first groove may be shorter or longer than a distance between the second groove and a third groove that is arranged directly adjacent to the second groove.

The driver roller comprising the at least the additional groove may also include a position adjusting mechanism. The position adjusting mechanism may be configured for movement of the driver roller along a rotational axis of the driver roller. The position adjusting mechanism may be configured to move the driver roller into alignment with the feedstock or the at least the additional feedstock. During the alignment, the feedstock or the at least the additional feedstock may line up with the groove or the at least the additional groove of the driver roller. The groove may comprise a radius that is at least about 0 percent (%), 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, or more of a radius of the feedstock. The groove may comprise a radius that is at most about 100%, 95%, 90%, 85%, 80%, 75%, 70%, 65%, 60%, 55%, 50%, 45%, 40%, 35%, 30%, 25%, 20%, 15%, 10%, 9%, 8%, 7%, 6% 5%, 4%, 3%, 2%, 1% or less of a radius of the feedstock.

The position adjusting mechanism of the driver roller may be automated. The driver roller may be coupled (e.g., mechanically attached) to the position adjusting mechanism. The controller may be in communication with the position adjusting mechanism. The controller may direct the position adjusting mechanism to move the driver roller during the alignment with the feedstock or the at least the additional feedstock. The position adjusting mechanism in communication with the controller may be a linear actuator. In some cases, the actuator in the position adjusting mechanism may be an electric linear screw actuator. In some cases, the position adjusting mechanism in communication with the controller may include one or more linear actuators.

In some examples, the position adjusting mechanism comprises a stage for holding at least the driver roller. The stage may further have one or more linear actuators that are mechanically attached to the stage.

In some examples, the system comprises a plurality of driver rollers. Each driver roller may be independently coupled (e.g., mechanically attached) to a position adjusting mechanism. Each position adjusting mechanism may be independently in communication with controller.

The driver roller may be coupled (e.g., mechanically attached) to an actuator that subjects the driver roller to rotation. The actuator may be a rotary actuator or an electric motor. Such rotation may feed the feedstock along a direction away from the feedstock source towards the opening of the guide. The actuator may rotate the driver roller at a plurality of rotating speeds. The actuator may be configured to accelerate, decelerate, maintain at a given speed of the plurality of rotating speeds, or control a direction of rotation of the driver roller. The actuator may be in communication with the controller. The controller may direct the actuator to rotate the driver roller. Alternatively or in addition to, the actuator may be in communication with a separate actuator controller.

In some examples, the driver roller is not coupled to an actuator, but may be configured to rotate upon application of force to the driver roller. For example, such force is provided by an actuator that is mechanically coupled to a feedstock that is in contact with the driver roller.

The system may include at least 1, 2, 3, 4, 5, 6, 7, 8, 9, 10, or more driver rollers. The system may include less than or equal to 10, 9, 8, 7, 6, 5, 4, 3, 2, or less driver rollers. Each driver roller may be independently coupled to an actuator for subjecting a rotational movement, and each actuator may be independently in communication with the controller.

The groove on the driver roller may be a V-groove roller. The groove may be V-shaped when viewed in cross-section. An angle between two sides of the V-groove may be no more than 160 degrees apart. The angle between the two sides of the V-groove may be at most about 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees, 20 degrees, 10 degrees or less apart. In some cases, the groove in the driver roller may be other than V-shaped, so that the stress(es), possible shavings, or other types of damages imposed on the groove and the feedstock at the contact surface(s) between the groove and the feedstock may be reduced. In some examples, the Hertz contact stress between the groove and the feedstock may be reduced by using a groove with curved faces. The curved faces may have radii of curvature that deviate from a radius of curvature of the feedstock by at most about 25%, 20%, 15%, 10%, 9%, 8%, 7%, 6% 5%, 4%, 3%, 2%, 1% or less. The curved faces may have radii of curvature that deviate from a radius of a cross-section of the feedstock by at most about 25 percent (%), 20%, 15%, 10%, 9%, 8%, 7%, 6% 5%, 4%, 3%, 2%, 1% or less. The curved faces may have radii of curvature that deviate from a radius of curvature of the feedstock by at least about 1%, 2%, 3%, 4%, 5%, 6%, 7%, 8%, 9%, 10%, 15%, 20%, 25%, or more. The curved faces may have radii of curvature that deviate from a radius of a cross-section of the feedstock by at least about 1%, 2%, 3%, 4%, 5%, 6%, 7%, 8%, 9%, 10%, 15%, 20%, 25%, or more.

The driver roller may be a U-groove roller. The groove may be U-shaped when viewed in cross-section. A distance between two parallel walls of the U-groove may be at least 1%, 2%, 3%, 4%, 5%, 6%, 7%, 8%, 9%, 10% or greater than a cross-sectional width of the feedstock. A distance between two parallel walls of the U-groove may be less than or equal to about 15%, 10%, 9%, 8%, 7%, 6% 5%, 4%, 3%, 2%, 1% or less than a cross-sectional width (or size) of the feedstock. In some cases, the distance may be a diameter of the feedstock. A radius of curvature of the U-groove may be substantially the same as a radius of curvature of the feedstock. In some examples, the radius of curvature of the U-groove deviates from the radius of curvature of the feedstock by at most 30%. In some examples, the radius of curvature of the U-groove deviates from the radius of curvature of the feedstock by at most 50%. In some examples, the radius of curvature of the U-groove deviates from the radius of curvature of the feedstock by at most 100%. The radius of curvature of the U-groove may deviate from the radius of curvature of the feedstock by at most about 100%, 90%, 80%, 70%, 60%, 50%, 40%, 30%, 25%, 20%, 15%, 10%, 9%, 8%, 7%, 6% 5%, 4%, 3%, 2%, 1% or less. The radius of curvature of the U-groove may deviate from the radius of curvature of the feedstock by at least about 1%, 2%, 3%, 4%, 5%, 6%, 7%, 8%, 9%, 10%, 15%, 20%, 25%, 30%, 40%, 50%, 60%, 70%, 80%, 90%, 95%, or more.

The driver roller may be a concave groove roller. The groove may be concave-shaped when viewed in cross-section. An opening of the concave groove may have a width that deviates at least about 1%, 2%, 3%, 4%, 5%, 6%, 7%, 8%, 9%, 10%, 20%, 30%, 40%, 50%, 100% or more from the cross sectional width of the feedstock. An opening of the concave groove may have a width that deviates less than or equal to about 100%, 50%, 40%, 30%, 20%, 15%, 10%, 9%, 8%, 7%, 6% 5%, 4%, 3%, 2%, 1% or less from the cross sectional width of the feedstock. An angle between two sides of the concave groove may be no more than 170 degrees apart. The angle between the two sides of the concave groove may be at most about 160 degrees, 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees or less apart. The angle between the two sides of the concave groove may be at least about 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees or more apart. The concave shape of the groove may correspond to at least a vertex section of an ellipsoid or a vesica piscis. The concave shape may have two sides converging at a tip of the vertex section. The two sides may have radii of curvature that are substantially the same as the radius of curvature of the feedstock. In some cases, the radii of curvature of the two sides of the concave groove may deviate from the radius of curvature of the feedstock by at most 30%. In some cases, the radii of curvature of the two sides of the concave groove may deviate from the radius of curvature of the feedstock by at most 50%. In some cases, the radii of curvature of the two sides of the concave groove may deviate from the radius of curvature of the feedstock by at most 100%. The radii of curvature of the two sides of the concave groove may derivate from the radius of curvature of the feedstock by at most about 100%, 90%, 80%, 70%, 60%, 50%, 40%, 30%, 25%, 20%, 15%, 10%, 9%, 8%, 7%, 6%, 5%, 4%, 3%, 2%, 1% or less. The radii of curvature of the two sides of the concave groove may derivate from the radius of curvature of the feedstock by at least about 1%, 2%, 3%, 4%, 5%, 6%, 7%, 8%, 9%, 10%, 15%, 20%, 25%, 30%, 40%, 50%, 60%, 70%, 80%, 90%, 95% or more. In some examples, the driver roller may have a complex concave groove to receive at least two feedstocks having different cross-sectional widths. The two feedstocks may have different cross-sectional diameters. The complex concave groove may comprise a plurality of concave grooves of varying dimensions vertically stacked in relation to one another. Each side of the complex concave groove may be a continuation of at least two concave curves. For example, if the side of the complex concave groove has two concave curves, an inner curve that is closer to a rotational axis of the driver roller may have a smaller radius of curvature than an adjacent outer curve that is closer to the outer circumference of the driver roller.

The surface of the groove in the driver roller may be partially or entirely smooth, knurled, or serrated to adjust contact surface area and/or frictional force between the groove and the feedstock.

The feedstock in contact with the driver roller may be a single feedstock. In some cases, the feedstock in contact with the driver roller may be a bundle of a plurality of feedstock. The bundle of a plurality of feedstock may be of substantially identical or different materials. The substantially identical or different materials may have substantially identical or different cross-sectional dimensions.

The system may include an assembly for directing or feeding the feedstock along the direction towards the guide. The assembly may comprise the driver roller and an additional roller. The additional roller may be a preload roller. The additional roller may be positioned above the driver roller with a gap or space between the outer circumferences of the driver roller and the additional roller. The gap or space may be greater than the cross-sectional dimension of the feedstock.

The additional roller in the assembly may be configured to (i) contact at least a portion of the feedstock and (ii) direct the at least the portion of the feedstock into the groove of the driver roller of the assembly. The additional roller may be configured with a suitable adjusting mechanism (e.g. a spring or an actuator) that may help vary a force exerted by the additional roller on the at least the portion of the feedstock. The outer circumference of the additional roller may have a shape that corresponds to the shape of the groove of the driver roller. The shape may help directing the at least the portion of the feedstock into the groove.

The outer circumference of the additional roller may be partially or entirely smooth, knurled, or serrated to adjust contact surface area and/or frictional force between the groove and the feedstock.

The system may include a feedstock merger. The merger may comprise at least one entry orifice for receiving the feedstock from the assembly and an exit orifice for directing the feedstock towards the guide. The merger may comprise a converging configuration to provide a path for the feedstock from the at least one entry orifice to the exit orifice. The converging configuration of the merger may direct the feedstock from the at least one entry orifice into the exit orifice.

In an example, the merger comprises a Y-shaped passageway. The Y-shaped passageway may include two entry channels in contact with two entry orifices, respectively, and one exit channel in contact with the exit orifice. The Y-shaped passageway may receive a first feedstock and a second feedstock. If the first feedstock is to be used for printing, a first actuator of a first driver roller in contact with the first feedstock may subject the first driver roller to rotation. The rotation of the first driver roller may direct the first feedstock through a first entry channel of the Y-shaped passageway towards the exit channel. A second actuator of a second driver roller in contact with the second feedstock may be idle or turned off during the rotation of the first driver roller. Subsequent to printing at least a portion of the 3D object using the first feedstock, the first actuator may direct the first driver roller to rotate in an opposite direction to withdraw the first feedstock away from the guide and away from the exit channel of the Y-shaped path in the merger.

In some examples, the converging configuration of the merger may be configured to (i) simultaneously receive more than one feedstock from the at least one entry orifice, (ii) arrange the more than one feedstock into a bundle of more than one feedstock, and (iii) direct the bundle of more than one feedstock into the exit orifice. The feedstock in the bundle of more than one feedstock may be arranged in a linear or twisted fashion.

In an example, the merger comprises a Y-shaped passageway and a tubular channel. The Y-shaped path may include two entry channels in contact with two entry orifices, respectively, to receive two feedstocks. The Y-shaped guide channel may include one exit channel to simultaneously receive and direct the two feedstocks towards the exit orifice. The tubular channel may be positioned between the exit channel of the Y-shaped passageway and the exit orifice. The tubular channel may comprise an opening to receive one or both of the two feedstocks. The tubular channel may include an actuator to rotate the tubular channel. While the tubular channel receives the two feedstocks from the exit channel of the Y-shaped passageway and directs the two feedstocks towards the exit orifice, the actuator of the tubular channel may direct a rotation of the tubular channel as to twist the two feedstocks into a twisted bundle of feedstocks. The twisted bundle of feedstocks may be directed through the exit orifice of the merger towards the guide. Alternatively or in addition to, the tubular channel may receive the two feedstocks and direct a parallel bundle of the two feedstocks towards the guide while the tubular channel remains stationary.

The merger may be in communication with the controller. The controller may be configured to instruct the merger to direct the feedstock from the at least one entry orifice into the exit orifice. The controller may be configured to arrange the more than one feedstock into the bundle. The bundle may be a twisted bundle of at least about 2, 3, 4, 5, 6, 7, 8, 9, 10 or more feedstocks. The bundle may be a twisted bundle of less than or equal to about 10, 9, 8, 7, 6, 5, 4, 3, 2 feedstocks. The bundle may be a parallel bundle of 2, 3, 4, 5, 6, 7, 8, 9, 10 or more feedstocks. The bundle may be a parallel bundle of less than or equal to about 10, 9, 8, 7, 6, 5, 4, 3, 2 feedstocks.

The assembly comprising the driver roller and the additional roller may be configured adjacent to the at least one entry orifice of the merger. The assembly may push the feedstock from the feedstock source towards the merger. The assembly may be a pusher assembly or a pusher feeder assembly.

In some examples, the system may include a buffer idler. The buffer idler may be disposed between the feedstock source and the pusher feeder assembly. The buffer idler may be configured to (i) contact at least a portion of the feedstock and (ii) direct the at least the portion of the feedstock towards the pusher feeder assembly or a puller feeder assembly. The buffer idler may contact and supply a force to the at least the portion of the feedstock to maintain a tension on the feedstock between the feedstock source (e.g., spool, drum, etc.) to the pusher feeder assembly. The buffer idler may be a dancer idler.

The assembly comprising the driver roller and the additional roller may be configured adjacent to the exit orifice of the merger. The assembly may pull the feedstock along a direction away from the merger towards the guide. The assembly may be a puller assembly or a puller feeder assembly.

The merger may comprise at least one conduit. The at least one conduit may provide a continuous passageway for the feedstock (i) from the pusher assembly to the at least one entry orifice of the merger, (ii) from the exit orifice of the merger to the puller assembly, (iii) or from the puller assembly to the guide. One end of the at least one conduit may be connected to the at least one entry orifice or the exit orifice of the merger to allow a continuous passage for the feedstock. The continuous passageway may reduce significant wear and wire buckling throughout the system.

In some examples, the at least one conduit may provide a continuous passageway for the feedstock from the puller assembly to the guide. As an alternative, the at least one conduit may provide discontinuous passageway. For example, the conduit may include a blocking unit to open or close the passageway.

The at least one conduit may be a flexible tube. The at least one conduit may be an isolated metal tubing. The at least one conduit may be formed of at least one electrical insulator. The at least one conduit may be formed of one or more polymers selected from the group comprising polyacrylics, polyesters, polyvinyls, diallylphthalate and other allylic polymers, polyepoxides, polyurethanes, polyimides, polysiloxanes, fluorocarbons and other fluorinated polymers, polysulfones, polyamides, and polysulfides. Examples of the fluorinated polymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA).

The system may include at least 1, 2, 3, 4, 5, 6, 7, 8, 9, 10 or more additional buffer idlers. The system may include less than or equal to about 10, 9, 8, 7, 6, 5, 4, 3, 2, or less additional buffer idlers. Each of the at least 1, 2, 3, 4, 5, 6, 7, 8, 9, 10 or more additional buffer idlers may be disposed between a feedstock source and a pusher feeder assembly, respectively. Each of the less than or equal to about 10, 9, 8, 7, 6, 5, 4, 3, 2, or less additional buffer idlers may be disposed between a feedstock source and a pusher feeder assembly, respectively. In an example, the system includes one additional buffer idler. The additional buffer idler may be disposed between an additional feedstock source and an additional pusher feeder assembly. The additional buffer idler may be configured to (i) contact at least a portion of the feedstock and (ii) direct the at least the portion of the feedstock along a direction towards the guide.

FIG. 1 schematically illustrates an example of a 3D printing system ("system") 101. The system 101 comprises a support 102 for holding at least a portion of the 3D object 103 during printing. The system 101 also comprises a wire source 104 configured to hold a wire 106. The system 101 also comprises an additional wire source 108 configured to hold an additional wire 110. The wires 108 and 110 are usable for the printing at least a portion of a larger 3D object or an entirety of the 3D object. The system 101 comprises a guide 112, which directs a selected wire 114 from the wires 106 and 110 towards and in contact with the support 102 or a portion of the 3D object adjacent to the support 102. The system 101 includes a driver roller 116. The driver roller 116 comprises a groove 118 that is configured to (i) accept at least a portion of the wire 106 and (ii) direct the at least the portion of the wire 106 towards the guide 112. The system 101 also includes an additional driver roller 120. The driver roller 120 comprises a groove 122 that is configured to (i) accept at least a portion of the wire 110 and (ii) direct the at least the portion of the wire 110 towards the guide 112. A power source 124 is in electrical communication with the selected wire 114 and the support 102. The power source 124 is configured to supply electrical current to the selected wire 114 and the support 102 during the printing. A controller 126 is in communication with the power source 124. The controller 126 is configured to direct the power source 124 to flow the electrical current to the selected wire 114 and the support 102 during the printing under conditions sufficient to melt the selected wire 114 when the selected wire 114 is in contact with the support 102 or the portion of the 3D object. Additionally, the controller 126 is in communication with the driver rollers 116, 120, and 152. The controller is also in communication with the wire sources 104 and 108.

The system 101 in FIG. 1 includes a pusher feeder assembly 128 for directing or feeding the wire 106 from the wire source 104 along the direction towards the guide 112.

The assembly 128 comprises the driver roller 116 and a preload roller 130. The preload roller 130 is configured to (i) contact at least a portion of the wire 106 and (ii) direct 132 the at least the portion of the wire 106 into the groove 118 of the driver roller 116. The system also includes a buffer idler 134. The buffer idler 134 is disposed between the wire source 104 and the pusher feeder assembly 128. The buffer feeder 134 is configured to (i) contact at least a portion of the wire 106 and (ii) direct the at least the portion of the wire 106 towards the pusher feeder assembly 128. The system 101 also includes an additional pusher feeder assembly 136 for directing or feeding the wire 110 from the wire source 108 along the direction towards the guide 112. The assembly 136 comprises the driver roller 120 and an additional preload roller 138. The preload roller 138 is configured to (i) contact at least a portion of the wire 110 and (ii) direct 140 the at least the portion of the wire 110 into the groove 122 of the driver roller 120. The system also includes an additional buffer idler 142. The buffer idler 142 is disposed between the wire source 108 and the pusher feeder assembly 136. The buffer feeder 142 is configured to (i) contact at least a portion of the wire 110 and (ii) direct the at least the portion of the wire 110 towards the pusher feeder assembly 136.

The system 101 in FIG. 1 includes a wire merger 144. The wire merger 144 is configured to receive the wires 106 and 110 from the pusher feeder assemblies 128 and 136, respectively, and direct one of the wires 106 and 110 as a selected wire 114 towards the guide 112. If the wire 106 is to be used to print a portion of a 3D object, the controller may (i) direct the driver roller 120 of the pusher feeder assembly 136 to retract the wire 110 out of the wire merger 144 towards the wire source 108, and (ii) direct the driver roller 116 of the pusher feeder assembly 128 to direct the wire 106 into the wire merger 144 towards the guide 112. The system also includes flexible tubings 146 and 148. The flexible tubings 146 and 148 are connected by one end to the wire merger 144. The flexible tubings 146 and 148 provide continuous passageways for the wires 106 and 110, respectively, into the wire merger 144. The flexible tubings 146 and 148 reduce significant wear and wire buckling while feeding into the wire merger 144.

The system 101 in FIG. 1 also includes a puller feeder assembly 150 for directing or feeding the selected wire 114 from the wire merger 144 towards the guide 112. The puller feeder assembly 150 comprises an additional driver roller 152 with a groove 154 and an additional preload roller 156. The preload roller 156 is configured to (i) contact at least a portion of the selected wire 114 and (ii) direct 158 the at least the portion of the wire 114 into the groove 154 of the driver roller 152. In the system 101, the groove 118 of the driver roller 116, the groove 122 of the driver roller 120, and the groove 154 of the driver roller 152 may have identical or different dimensions depending on cross-sectional dimensions of the wires 106, 110, and 114. For example, the groove 118 of the driver roller 116, the groove 122 of the driver roller 120, and the groove 154 of the driver roller 152 may have different dimensions if the cross-sections of the wires 106, 110, and 114 are different. The groove 118 may have a dimension that is greater than groove 122 if the wire 106 has a greater cross-section than the wire 110.

Figure 2:
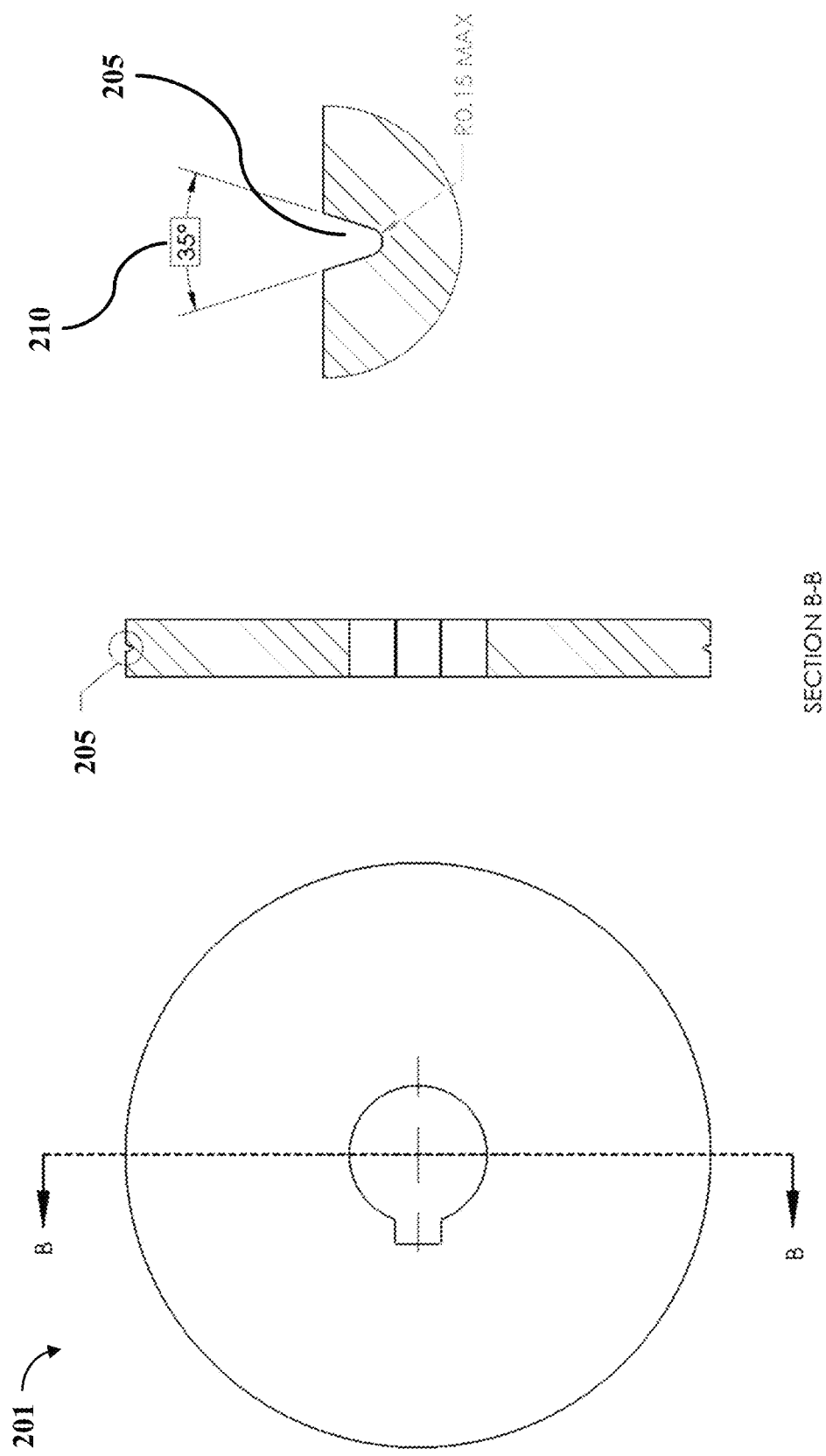
FIG. 2A-2C are side, partial top, and partial cross-sectional views, respectively, of a driver roller with a V-groove.

FIG. 2A-2C schematically illustrates an example of a driver roller 201. FIG. 2A-2C are side, partial top, and partial cross-sectional views (e.g., a zoomed in view of 201), respectively, of a driver roller 201 with a V-groove 205. The angle 210 between two sides of the V-groove 205 is illustrated as 35 degrees. In some cases, the angle 210 may be at most about 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees, 20 degrees, 10 degrees or less apart. The angle 210 may be at least about 5 degrees, 10 degrees, 20 degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, or more apart. The V-groove geometry can handle inherent tolerances within a source of wire, but not incremental diameter changes between multiple sources wires. For example, a wire diameter can be 0.035 inches (0.89 mm). The tolerance on the wire can be about +/−0.0005 inches (0.013 mm). Such tolerance on the wire diameter can be accommodated in a V-groove roller. If it is necessary to change the wire diameter to 0.045 inches (1.14 mm), for instance, the V-groove roller can be adjusted to handle the different wire diameter. The adjustment of the V-groove roller can be accomplished by (i) replacing the V-groove roller with a different V-groove roller that comprises a different V-groove dimension, or (ii) using a multi-groove roller comprising, in parallel, multiple V-grooves with varying widths and angles. One or more V-grooves can be formed within a V-groove. Replacing the V-groove roller or adjusting a position of the multi-groove roller in relation to the wire can be a manual user operation or a controller automated process.

Figure 3:
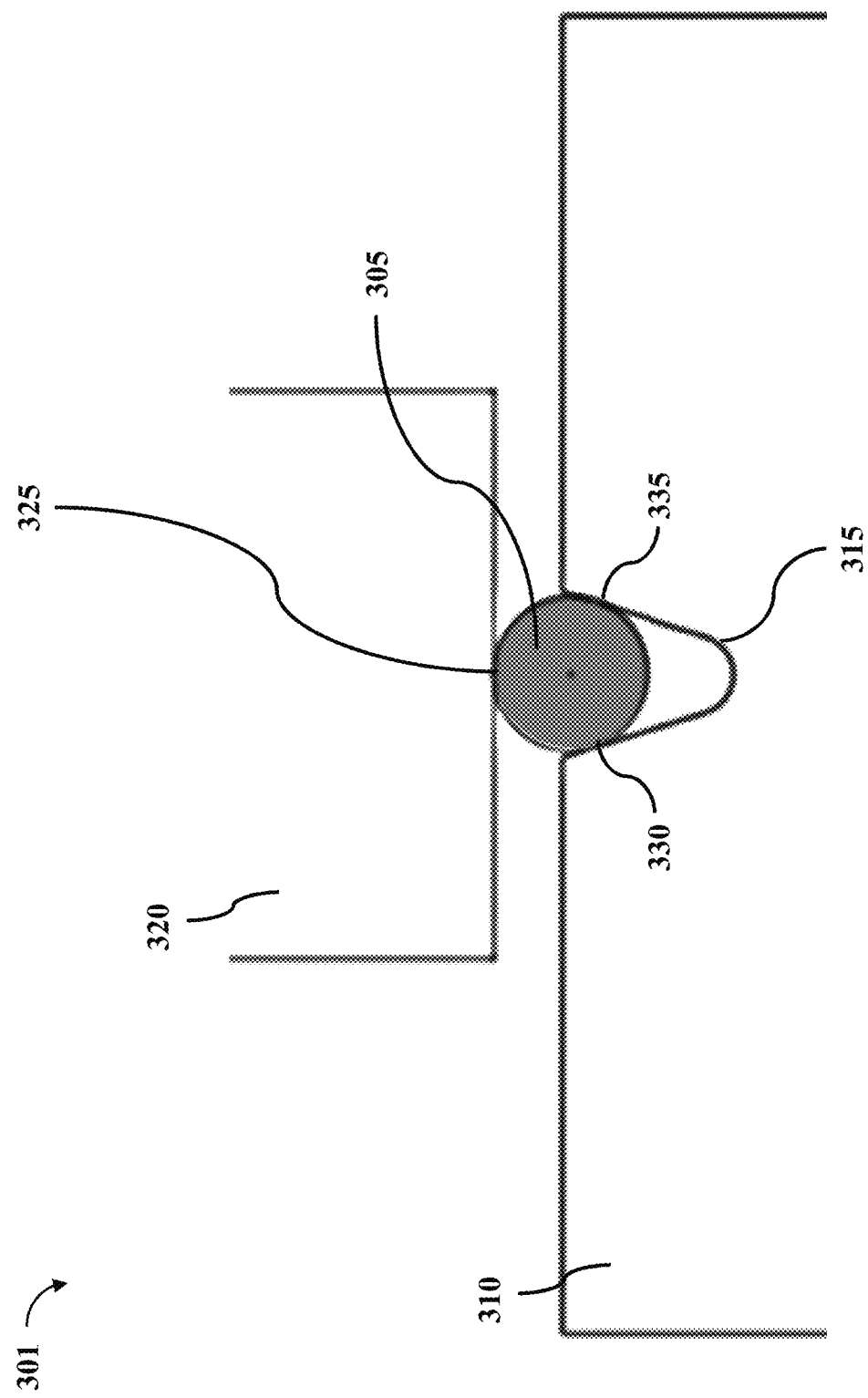
FIG. 3 is a partial a cross-sectional view of a wire feeding assembly.

FIG. 3 schematically illustrates a partial a cross-sectional view of an assembly 301 while a wire 305 is fed through the assembly. The assembly comprises a driver roller 310 with a V-groove 315 and a preload roller 320. In some cases, the assembly may comprise an adjusting mechanism (e.g., a spring or an actuator) to control a force exerted by the preload roller 320 on the wire 305 and towards the V-groove 315. The adjusting mechanism can push the preload roller 320 to (i) contact at least a portion of the wire 305 and (ii) direct the at least the portion of the wire 305 into the V-groove 315 of the driver roller 310 of the assembly 301. In some cases, the driver roller 310 can be rotationally actuated by an electric motor. When the wire is fed between the preload roller 320 and the driver roller 310, the preload roller 320 can push the wire 305 into the V-groove 315 and create normal forces at three contact surfaces 325, 330, and 335. The three contact surfaces include a portion of the circumferential surface 325 of the preload roller 320 and a portion of each side 330 and 335 of the V-groove 315.

Using the V-groove roller assembly illustrated in FIG. 3 as an example, normal forces at the wire-V-groove contact surfaces can be calculated as a function of the V-groove angle ($\theta$). A traction force ($F_{Traction}$) is the total force applied axially to the wire 305 by the driver roller 310. There are two contact surfaces 330 and 335 between the wire 305 and the V-groove 315 of the driver roller 310. Each of the two contact surfaces experience a normal force ($F_{Normal}$) that is generated by a force exerted by the preload roller ($F_{preload}$). As such, the normal force ($F_{Normal}$) multiplied by the static coefficient of friction ($\mu_{Static}$) provides half of the traction force ($F_{Traction}$). The normal force ($F_{Normal}$) on each of two contact points of the V-groove is equal to the preload force ($F_{Preload}$) divided by 2 times the sine of half the angle of the V-groove. Thus, the maximum traction force ($F_{Traction}$) can be illustrated as shown in Equation 3:

$$F_{Traction} = $$

$$2 \times F_{Normal} \times \mu_{Static} = 2 \times \left[ \frac{F_{Preload}}{2 \times \sin\left(\frac{\theta}{2}\right)} \right] \times \mu_{Static} \quad \text{(Equation 3)}$$

Figure 4:
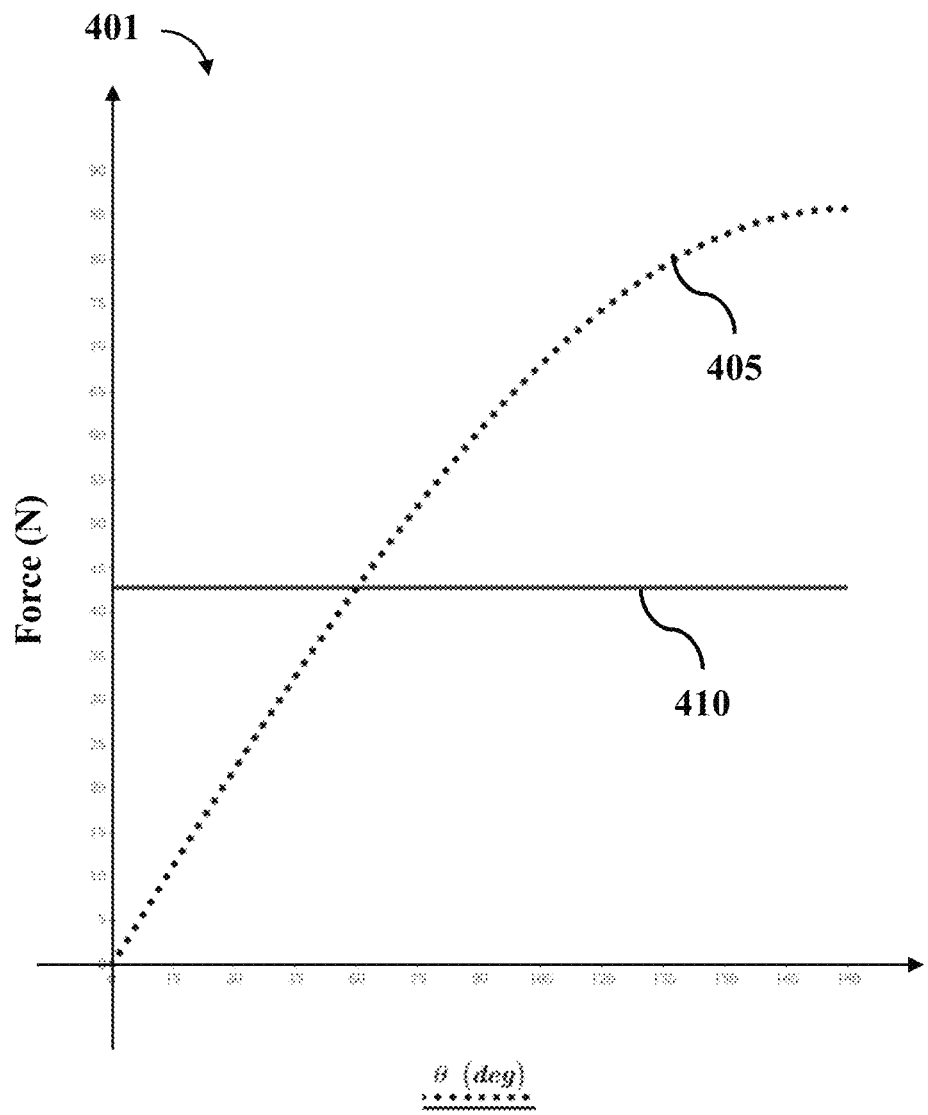
FIG. 4 illustrates a calculation of a traction force during wire feeding.

Given a minimum traction force ($F_{minTraction}$) required for the 3D printing system, a respective preload force ($F_{preload}(\theta)$) exerted by the preload roller 320 can be solved as a function the V-groove angle ($\theta$). In an example, a wire made of aluminum is used for a calculation. Aluminum has a static friction coefficient ($\mu_{Static}$) of 0.35. The minimum traction force ($F_{minTraction}$) required is 30 newton (N), and thus the minimum normal force ($F_{minNormal}$) at each of the contact areas of the V-groove 330 and 335 can be calculated to be about 43 N. The graph 401 in FIG. 4 illustrates a plot 405 of the respectively required preload force ($F_{preload}(\theta)$) as a function of the V-groove angle ($\theta$). The graph 401 also illustrates the minimum normal force (F minNormal) of the V-groove as a constant horizontal plot 410. The graph 401 illustrates that, when given such parameters, the required preload force of the preload roller ($F_{preload}(\theta)$) can exceed the minimum normal force of the V-groove ($F_{minNormal}$) when the V-groove angle ($\theta$) is greater than 60 degrees. The phenomenon of the preload force exerted on the wire exceeding the normal force at the V-groove surface is known as a wedging effect. The wedging effect may lead to wear and fretting of the wire, the driver roller, or both.

Figure 5A:
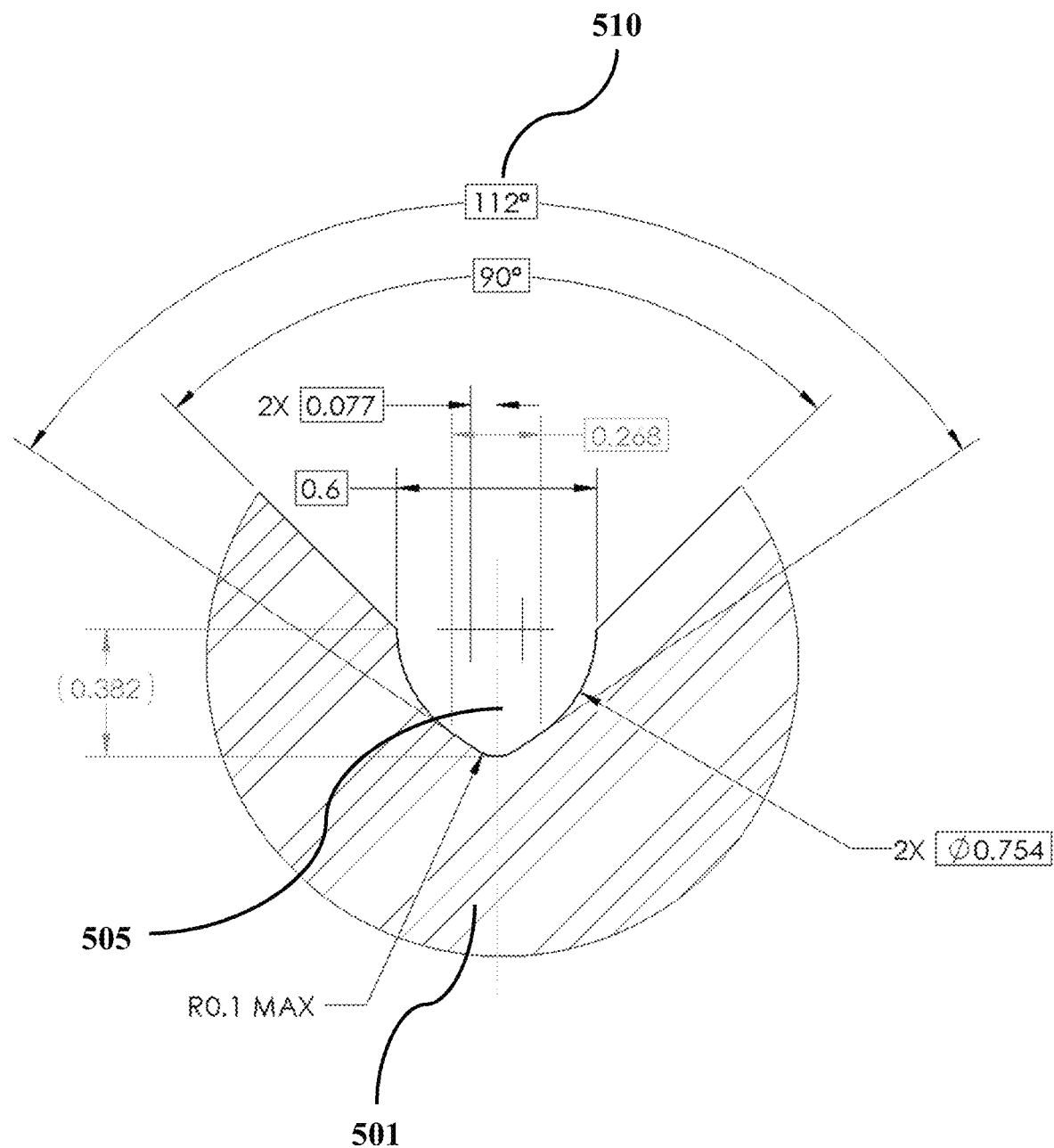
FIG. 5A-5B is a partial cross-sectional view of a different driver roller and an assembly comprising the different driver roller, respectively.

A concave groove driver roller may include two walls. An angle between the two walls of the concave groove may be at most about 160 degrees, 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees or less apart. An angle between the two walls of the concave groove may be at least about 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, or more apart. FIG. 5A schematically illustrates a partial cross-sectional view (e.g., a zoomed in view) of a concave groove driver roller 501 with a concave groove 505. The angle 510 between two walls of the concave groove 505 is illustrated as about 112 degrees. In some cases, the angle 510 may be less than or greater than 112 degrees. The concave groove geometry 505, in comparison to the V-groove 315 in the driver roller 310, may be configured to reduce stress on a wire that is in contact with the concave groove driver roller 501 or portions of the driver roller 501 that are in contact with the wire while the wire is directed from the wire source to the print head during 3D printing.

Figure 5B:
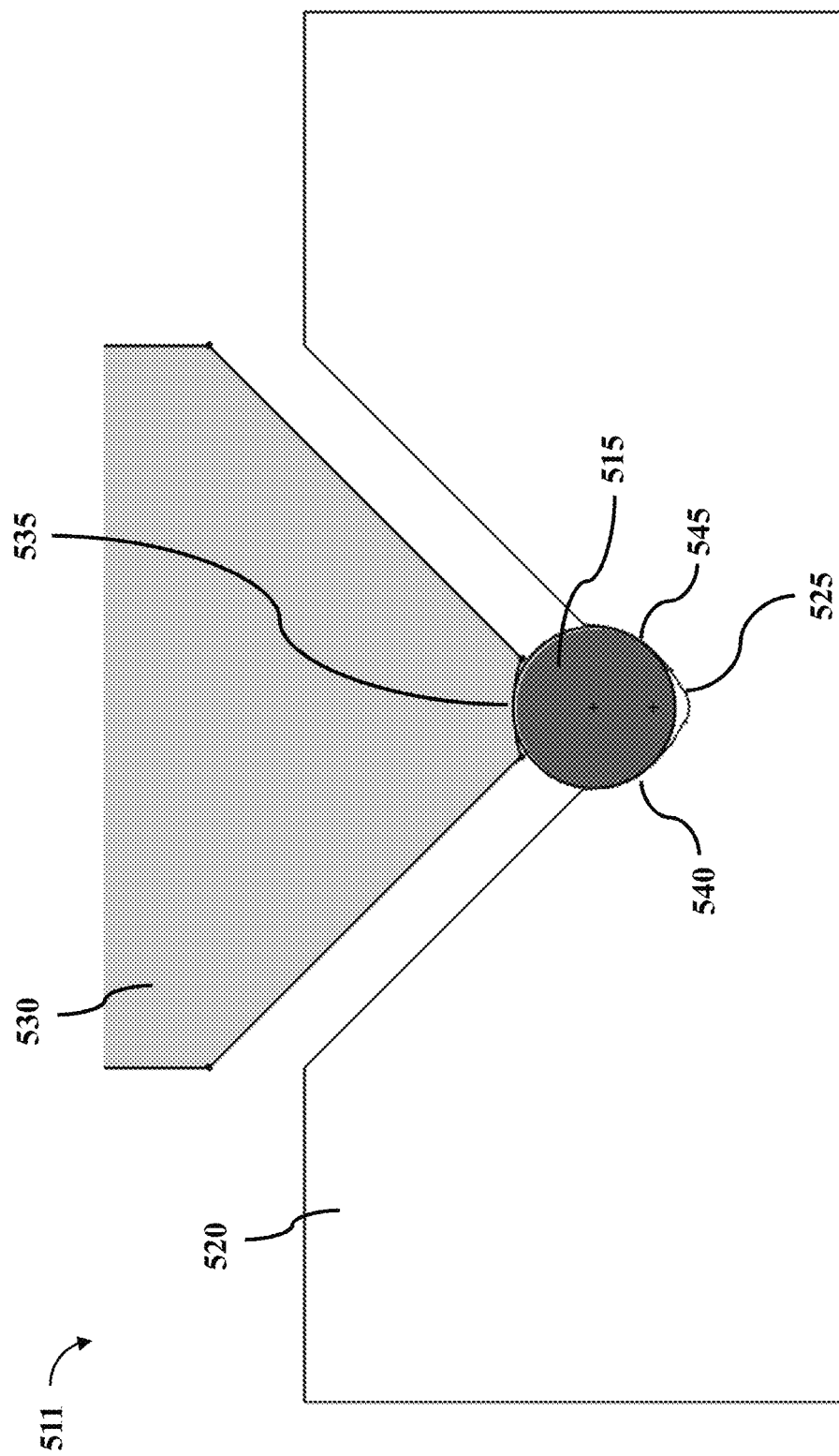

FIG. 5B schematically illustrates a partial cross-sectional view of an assembly 511 while a wire 515 is fed through the assembly. The assembly comprises a driver roller 520 with a concave groove 525 and a preload roller 530. The assembly can comprise an adjusting mechanism (e.g., a spring or an actuator) to control a force exerted by the preload roller 530 on the wire 515 and towards the concave groove 525. The adjusting mechanism can push the preload roller 530 to (i) contact at least a portion of the wire 515 and (ii) direct the at least the portion of the wire 515 into the concave groove 525 of the driver roller 520 of the assembly 511. In some cases, the driver roller 520 can be rotationally actuated by an electric motor. When the wire is fed between the preload roller 530 and the driver roller 520, the preload roller 530 can push the wire 515 into the concave groove 525 and create normal forces at the contact surfaces 535, 540, and 545. The contact surfaces can include at least a portion of the circumferential surface 535 of the preload roller 530 and at least a portion of each side 540 and 545 of the concave groove 525. The surface of the preload roller 535 that is in contact with the wire 515 may be a concave surface.

The stress at contact surfaces between two objects can be calculated as a function of curvatures of faces of the two objects in contact. This calculation may be referred to as Hertz contact stress. In a contact between a wire and a groove on a driver roller, the Hertz contact stress can approach a minimum when a radius of curvature of the groove is substantially the same as a radius of curvature of the wire. Therefore, the driver roller 520 can have a concave groove 525 geometry reflecting the radius of curvature of the wire 515 in order to reduce the Hertz contact stress, reduce wear and fretting, and prolong the longevity of the driver roller.

The present disclosure provides approaches for calculating the Hertz contact stress of a wire feeding assembly comprising the concave groove driver roller. Wires made of aluminum or steel are used in the calculation. The friction coefficient ($\mu$), Young's modulus (E), Poisson's ratio ($\eta$), and tensile yield strength ($\sigma_y$) values of the wires are provided in TABLE 1. Other parameters for calculating the Hertz contact stress of the wire feeding assembly may include a radius of curvature of the wire ($R_{Wire}$), a radius curvature of the driver roller ($R_{Major}$), and a radius of curvature of the concave groove ($R_{Minor}$). In addition, the radius of curvature of the concave groove can also be described as a function of the radius of curvature of the wire by a variable ratio ($A_R$), as shown in Equation 4:

$$R_{Minor}(A_R) := A_R \cdot \pi \cdot R_{Wire} \quad \text{(Equation 4)}$$

TABLE 1

Materials properties metal wires.

| | $\mu$ | E (GPa) | $\eta$ | $\sigma_y$ (MPa) |
|---|---|---|---|---|
| steel | 0.31 | 200 | 0.30 | 450 |
| SS | 0.31 | 193 | 0.31 | 290 |
| Al | 0.35 | 69 | 0.33 | 276 |
| Ti | 0.36 | 114 | 0.34 | 880 |
| Cu | 0.32 | 117 | 0.36 | 333 |

For example, when the preload roller pushes the wire into the concave groove of the concave groove driver roller, an area of contact between the wire and the concave groove is described as an area of an ellipse ($a(A_R)$) as a function of the variable ratio ($A_R$), as shown in Equation 5:

$$a(A_R) := \pi \cdot c(A_R) \cdot d(A_R) \quad \text{(Equation 5)}$$

where $c(A_R)$ is a radius of a first axis of the ellipse, and $d(A_R)$ is a radius of a second axis of the ellipse.

Within the area of contact, two forces may induce shear on the wire. The two forces include a shear stress induced by the normal force ($\tau_{Normal}$) from the driver roller, and a traction shear stress ($\tau_{Traction}$) induced by a rotation of the driver roller. Thus, a maximum shear stress exerted on the wire is a sum of the two shear stresses, as described in Equations 6-8:

$$\tau_{Max,Wire} := \tau_{Normal}(A_R) + \tau_{Traction}(A_R) \quad \text{(Equation 6)}$$

$$\tau_{Normal}(A_R) := \quad \text{(Equation 7)}$$
$$\frac{q(A_R)}{2} \cdot \left( \frac{1+2\cdot\eta_{Roller}}{2} + \frac{2}{9} \cdot (1+\eta_{Roller}) \cdot \sqrt{2\cdot(1+\eta_{Roller})} \right)$$

$$\tau_{Traction}(A_R) := \frac{\mu_{Wire} \cdot F_{minNormal}}{\alpha(A_R)} \quad \text{(Equation 8)}$$

where $q(A_R)$ is a normal pressure exerted on the area of contact, described in Equation 9:

$$q(A_R) := \frac{3 \cdot F_{minNormal}}{2 \cdot \pi \cdot c(A_R) \cdot d(A_R)} \quad \text{(Equation 9)}$$

Given a 440C stainless steel driver roller with Poisson's ratio ($\eta$) of 0.31, a tensile yield strength ($\sigma_y$) of 1280 megapascal (MPa), and Young's modulus (E) of 200 gigapascal (GPa), a minimum traction force ($F_{minTraction}$) of 30 N, a minimum normal force ($F_{minNormal}$) of about 43 N, a radius of curvature of the wire of 12.5 mm, a radius curvature of the driver roller ($R_{Major}$) of 25 mm, and a V-groove angle of 45 degrees, the Hertz stress calculations can be solved for the maximum shear stress exerted on the wire ($\tau_{Max,Wire}$).

Figure 6:
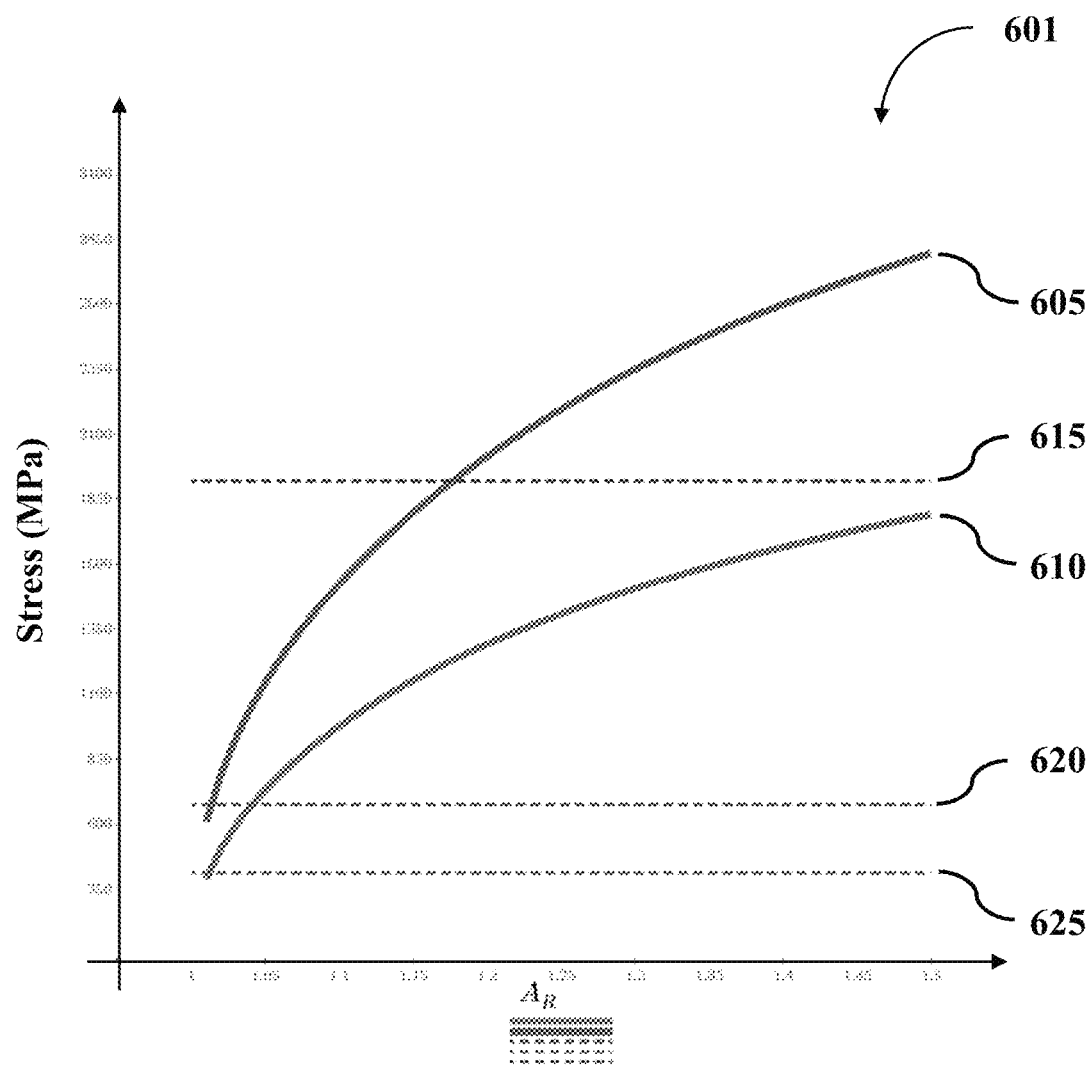
FIG. 6 illustrates a calculation of contact stress during wire feeding.

FIG. 6 shows a graph 601 of the maximum shear stress exerted on the wire ($\tau_{Max,Wire}$) within the concave driver roller 501 as a function of the variable ratio ($A_R$). The top curved line 605 in the graph represents a maximum shear stress exerted on a steel wire ($\tau_{maxSteel}(A_R)$), and the bottom curved line 610 represents a maximum shear stress exerted on an aluminum wire ($\tau_{maxAl}(A_R)$). The dotted horizontal lines in the graph represent the yield strength of the concave driver roller 615, the steel wire 620, and the aluminum wire 625. The graph illustrates that, when given such parameters, the maximum shear stress exerted on the wire approaches a minimum when the radius of curvature of the groove of the driver roller is substantially the same as the radius of curvature of the wire. Hence, stresses in the driver roller and the wire during wire feeding can be decreased by using a variation of the concave groove roller 501, where the radius of curvature of the concave groove is substantially the same, or at least about 1%, 2%, 3%, 4%, 5%, 6%, 7%, 8%, 9%, 10%, 20%, 30%, 40%, 50% or greater than the radius of curvature of the wire. Stresses in the driver roller and the wire during wire feeding can be decreased by using a variation of the concave groove roller 501, where the radius of curvature of the concave groove is substantially the same, or at most about 50%, 40%, 30%, 20%, 10%, 9%, 8%, 7%, 6%, 5%, 4%, 3%, 2%, 1%, or less than the radius of curvature of the wire.

Figure 7:
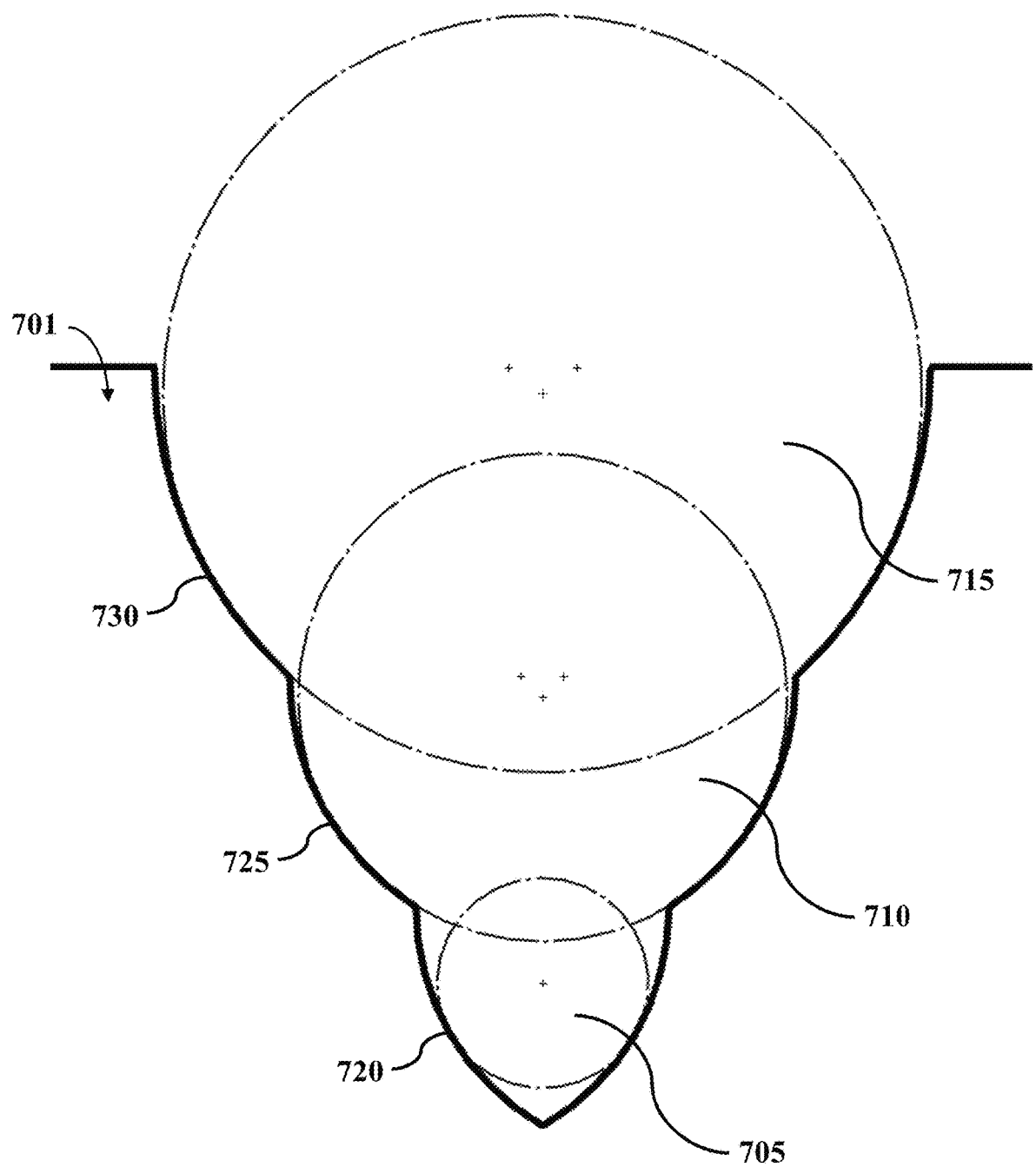
FIG. 7 illustrates a partial cross-sectional view of a multi-groove roller.

In another example, FIG. 7 schematically illustrates a partial cross-sectional view of a complex Hertz roller 701 as a variation of a driver roller that can receive three wires 705, 710, and 715 with three discrete diameters. The complex Hertz roller comprises three concave grooves 720, 725, and 730 of varying dimensions vertically stacked in relation to one another. A radius of curvature of the first groove 720 that is closer to a rotational axis of the complex Hertz roller is smaller than a radius of curvature of the second groove 725 that is arranged directly above the first groove. The radius of curvature of the second groove 725 is smaller than the radius of curvature of the third groove 730 that is arranged directly above the third second groove. The radius of curvature of the first groove 720 is substantially the same, or at least about 1%, 2%, 3%, 4%, 5%, 6%, 7%, 8%, 9%, 10%, 15%, 20%, 25%, 30%, 40%, 50%, or greater than the radius of curvature of the first wire 705. The radius of curvature of the first groove 720 is substantially the same, or at most about 50%, 40%, 30%, 25%, 20%, 15%, 10%, 9%, 8%, 7%, 6% 5%, 4%, 3%, 2%, 1% or less than the radius of curvature of the first wire 705. The radius of curvature of the second groove 725 is substantially the same, or at least about 1%, 2%, 3%, 4%, 5%, 6%, 7%, 8%, 9%, 10%, 15%, 20%, 25%, 30%, 40%, 50%, or greater than the radius of curvature of the second wire 710. The radius of curvature of the second groove 725 is substantially the same, or at most about 50%, 40%, 30%, 25%, 20%, 15%, 10%, 9%, 8%, 7%, 6% 5%, 4%, 3%, 2%, 1% or less than the radius of curvature of the second wire 710. The radius of curvature of the third groove 730 is substantially the same, or at least about 1%, 2%, 3%, 4%, 5%, 6%, 7%, 8%, 9%, 10%, 15%, 20%, 25%, 30%, 40%, 50%, or greater than the radius of curvature of the first wire 715. The radius of curvature of the third groove 730 is substantially the same, or at most about 50%, 40%, 30%, 25%, 20%, 15%, 10%, 9%, 8%, 7%, 6% 5%, 4%, 3%, 2%, 1% or less than the radius of curvature of the first wire 715.

In another aspect, the present disclosure provides a system for forming a three-dimensional (3D) object. The system may comprise a roller comprising a groove that is configured to support at least a portion of a wire. The system may comprise a controller. The controller may direct the roller to bring the wire in contact with a support. The controller may direct generation of heat from within the wire to melt the wire when the wire is in contact with the support, to form at least a portion of the 3D object. In some cases, the system may comprise a power supply in electrical communication with the wire and the support. The controller may direct the power supply to supply electrical current from the wire to the support, or vice versa, to generate the heat. The system may utilize various aspects of the aforementioned systems and methods for printing a 3D object, including a wire source configured to hold a wire.

Printing Methods

In an aspect, the present disclosure provides a method for printing a three-dimensional (3D) object. The method may comprise activating a 3D printing system, using a driver roller to direct movement of a feedstock, and directing a power source to supply electrical current to the feedstock and the support during printing. The electrical current between the feedstock and the support may be sufficient to melt the feedstock when the feedstock is in electrical communication (e.g., contact) with the support or a portion of the 3D object. The 3D printing system may comprise a support. The support may hold at least a portion of the 3D object during printing. The system may comprise a feedstock source. The feedstock source may be configured to hold the feedstock. The system may include a print head. The print head may include a guide comprising an opening for directing the feedstock from the feedstock source towards and in electrical communication (e.g., contact) with the support or the portion of the 3D object adjacent to the support. The system may include the driver roller. The driver roller may comprise a groove that is configured to (i) accept at least a portion of the feedstock and (ii) direct the at least the portion of the feedstock towards the guide.

The method may further comprise detecting when the feedstock is in contact with the support or the portion of the 3D object, and directing the power source to supply the electrical current to the feedstock and the support when the feedstock is detected to be in contact with the support or the portion of the 3D object. In an example, the feedstock is detected to be in contact with the support by directing electrical current through the feedstock to the support, or vice versa, such as under a constant applied voltage. When the flow of current is detected, it may be determined that the feedstock is in electrical communication with the support.

The method may further comprise adjusting a force of contact between the feedstock and the support or another object, such as at least a portion of the 3D object. The force may be detected by a pressure sensor located on a surface of the support. The surface of the support may be in contact with the feedstock or at least a portion of the 3D object. In an example, the force applied by the feedstock to the surface of the support is measured by a force sensitive resistor. A degree of change in resistance of the force sensitive resistor may be detected as force exerted by the feedstock on the support. The 3D printing system may include one or more actuators (e.g., motor) that permit the force to be adjusted. For example, a feedstock may be provided around a spool and directed to the support using an actuator that turns the spool. The actuator may regulate a rate of rotation or torque applied to the spool to adjust or regulate the force of contact. Alternatively or in addition to, an actuator connected to a driver roller may regulate a rate of rotation or torque applied to the driver roller to adjust or regulate the force of contact.

In another aspect, the present disclosure provides a method for forming a three-dimensional (3D) object. A roller comprising a groove may be provided. The groove may support at least a portion of a wire. The roller may be used to bring the wire in contact with a support. Heat from within the wire may be used to melt the wire when the wire is in contact with the support, thereby forming at least a portion of the 3D object. Using heat from within the wire to melt the wire may comprise directing electrical current from the wire to the support, or vice versa, to generate the heat. The method may utilize various aspects of the aforementioned systems and methods for printing a 3D object, including directing a power source to supply electrical current.

Figure 10:
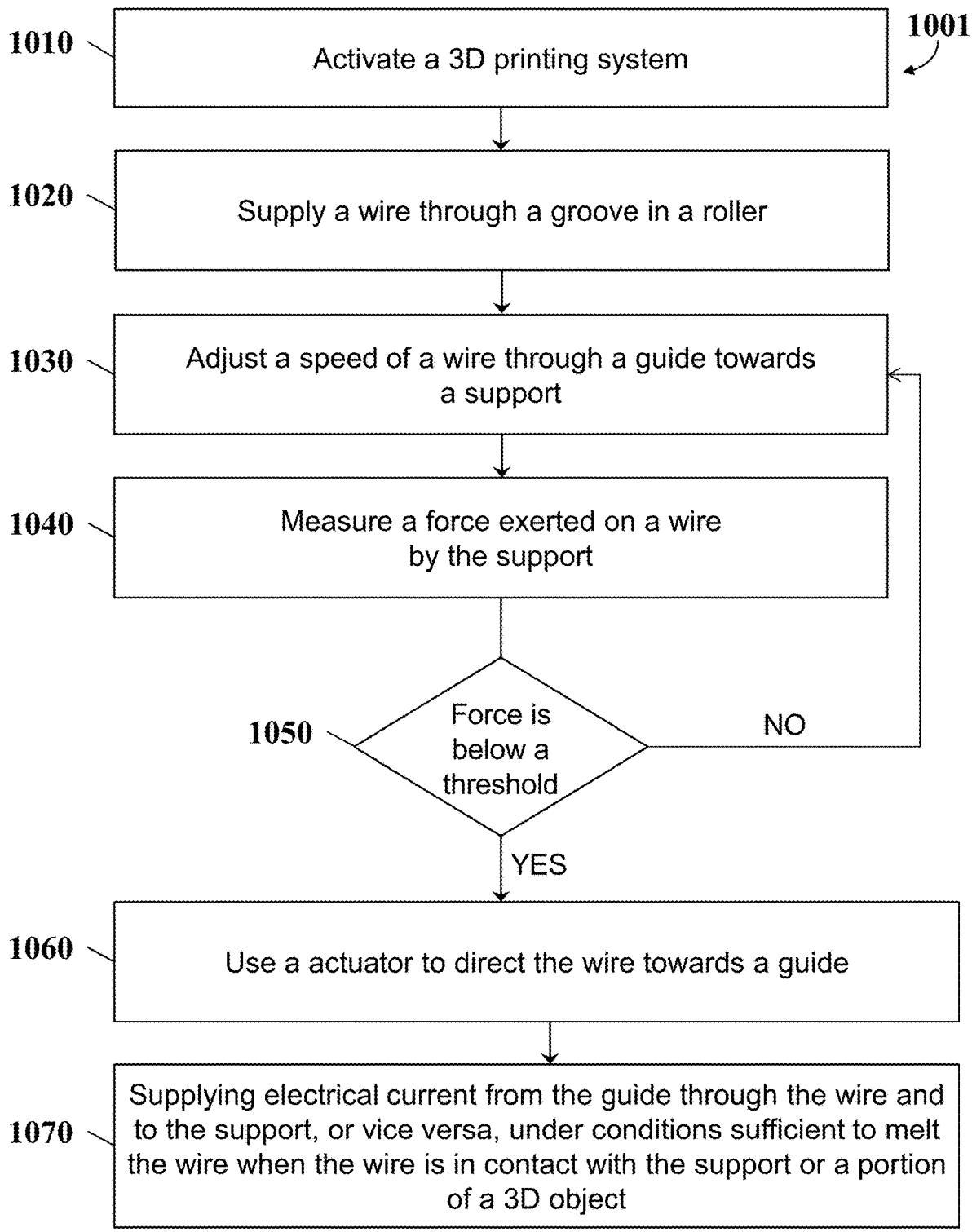
FIG. 10 schematically illustrates an example of a wire feeding method.

FIG. 10 schematically illustrates an example of wire feeding method ("method") 1001. In this example, the wire feeding method is an embodiment for 3D printing method. The method comprises activating a 3D printing system (process 1010). The 3D printing system comprises one or more components of the system for printing the 3D object, as provided herein. In an example, the 3D printing system may be an embodiment of the aforementioned wire feeding assembly 101, as illustrated in FIG. 1. Referring to FIG. 10, the method comprises supplying a wire (i.e., a feedstock) through a groove between in a roller (e.g., a driver roller) of the 3D printing system (process 1020). The method comprises adjusting a speed of the wire through a guide towards a support of the 3D printing system (process 1030). The method comprises measuring a force exerted on the wire by the support (process 1040). The method comprises comparing the measured force (or a plurality of measured forces at one position on the wire in contact with the support) to a threshold, and determining if the force is below the threshold (process 1050). The threshold may be a pre-determined threshold value or range of the force. The threshold may be a force acceptable by the wire without experiencing a significant damage (e.g., deformation or cut). The threshold may be a force acceptable by the support without experiencing a significant damage (e.g., deformation or cut). The threshold may be specific for a type of material the wire is made of. Alternatively or in addition to, the threshold may be a common threshold for different types of materials that different wires are made of. When the measured force exerted on the wire is above the threshold (process 1050, NO), the method comprises adjusting the speed of the wire through the guide towards the support (e.g., accelerate, decelerate) such that the force exerted on the wire is decreased. Alternatively, when the measured force exerted on the wire is equal to or below the threshold (process 1050, YES), the method comprises using an actuator (e.g., an actuator coupled to the driver roller) to direct the wire through the groove and towards the guide (process 1060). The guide is part of a print head of the 3D printing system. The method further comprises supplying electrical current from the guide through the wire and to the support (or vice versa), under conditions sufficient to melt the wire when the wire is in contact with the support or a portion of a 3D object (process 1070).

In another aspect, the present disclosure provides a method for printing a three-dimensional (3D) object adjacent to a support (e.g., base), comprising (a) receiving in computer memory a computational representation of the 3D object; (b) using a print head to initiate printing of the 3D object by, (i) directing at least one feedstock through a feeder towards the support and (ii) flowing electrical current through the at least one feedstock and into the support, or vice versa; (c) subjecting the at least one feedstock to heating upon flow of electrical current through the at least one feedstock and into the support, or vice versa, which heating is sufficient to melt at least a portion of the at least one feedstock; (d) depositing at least one layer of the at least the portion of the at least one feedstock or depositing the at least the portion of the at least one feedstock adjacent to the support in accordance with the computational representation of the 3D object, thereby printing the 3D object. In some embodiments, the method for printing the 3D object further comprises repeating (d) one or more times to deposit and shape additional portion(s) of the at least one feedstock or at least one other feedstock adjacent to the support. In some embodiments, the method for printing the 3D object further comprises subsequent to (d), changing a relative position of the one or more tips with respect to the at least one layer. A size of the at least the portion of the at least one feedstock may be controllable relative to the feedstock during deposition.

Computer Systems

The present disclosure provides a computer system 801 that is programmed to implement methods of 3D printing a 3D object in the present disclosure.

Figure 8:
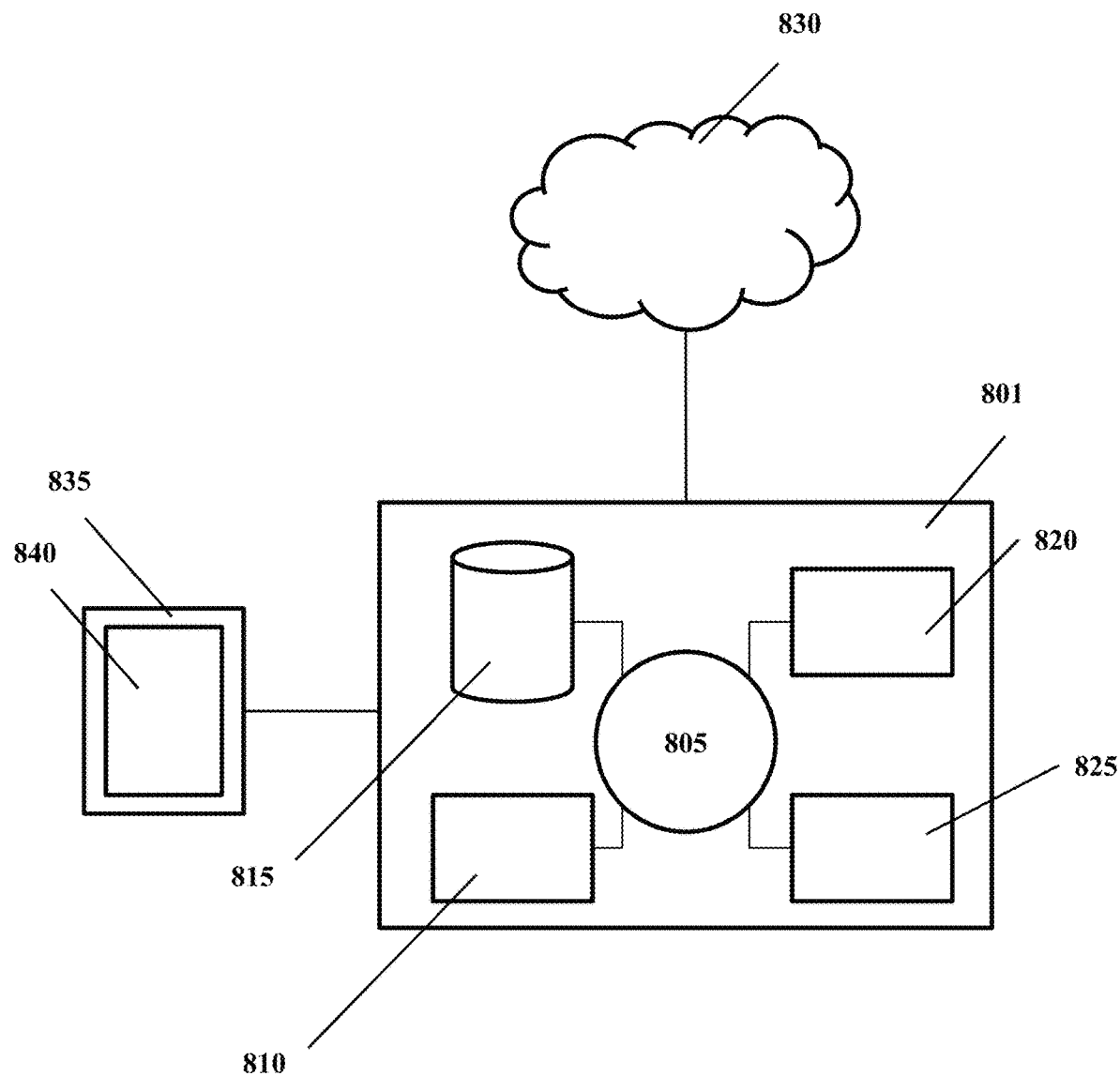
FIG. 8 shows a computer system that is programmed or otherwise configured to implement methods provided herein.

FIG. 8 shows the computer system 801 that is programmed or otherwise configured to communicate with and regulate various aspects of a 3D printer of the present disclosure. The computer system 801 can communicate with a power source or one or more actuators of the 3D printer. The computer system 801 can direct the power source to supply electrical current to a feedstock for use in printing a 3D object. The computer system 801 may also be programmed to communicate with a plurality of feedstock feeding assemblies. Each feedstock feeding assembly may comprise a driver roller and a preload roller, and the computer system 801 can be programmed to communicate with the driver roller and the preload roller independently or simultaneously. The computer system 801 can accelerate, decelerate, maintain at a given speed of a plurality of rotating speeds, or control a direction of rotation of the driver roller. The computer 801 can control the pressure of the preload roller as the preload roller pushes the feedstock into the driver roller. The computer system 801 may also be programmed to communicate with a feedstock merger to direct the wire merger to receive the feedstock from the plurality of feedstocks sources and direct at least one feedstock to the guide of the print head.

The computer system 801 can be an electronic device of a user or a computer system that is remotely located with respect to the electronic device. The electronic device can be a mobile electronic device.

The computer system 801 includes a central processing unit (CPU, also "processor" and "computer processor" herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840 for providing, for example, (i) activate or deactivate a 3D printer for printing 3D object, (ii) determine a selected feedstock from the plurality of feedstock sources for printing a portion of the 3D object based on a computer modeling of the 3D object, or (iii) determine operating positions or speeds of a plurality of feedstock feeding assemblies to adjust a printing speed. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, (i) assign a specific feedstock or a combination of at least two or more feedstocks selected from the plurality of feedstock sources to at least one of point (e.g. voxel) of the 3D object and (ii) communicate with the feedstock merger to feed the specific feedstock or the combination of at least two or more feedstocks to the guide of the print head during printing the at least one voxel of the 3D object.

Example I

This example provides finite element analysis (FEA) simulations of wire deformation in a wire feeding assembly that comprises a driver roller and a preload roller. The FEA simulations are performed using computer software (e.g., COMSOL Multiphysics, Flow 3D, solidworks, MATLAB). The wire, the groove of the driver roller, and the preload roller are subjected under a strain, then solved for their von Mises stresses. The driver roller and the preload roller comprise 440C steel, and the wire is an aluminum wire having a diameter of 0.25 millimeter (mm). A displacement of 2.5 micrometer (μm) is represented as a unit of 1 during simulation. The 2.5 micrometer (μm) displacement is substantially equal to 1% strain in the aluminum wire. This FEA simulation model takes into account plastic deformation by using the Ramberg-Osgood stress-strain relationship, and solves for the effective plastic strain using isotropic hardening with tangent data from the Ramberg-Osgood model.

Figure 9A:
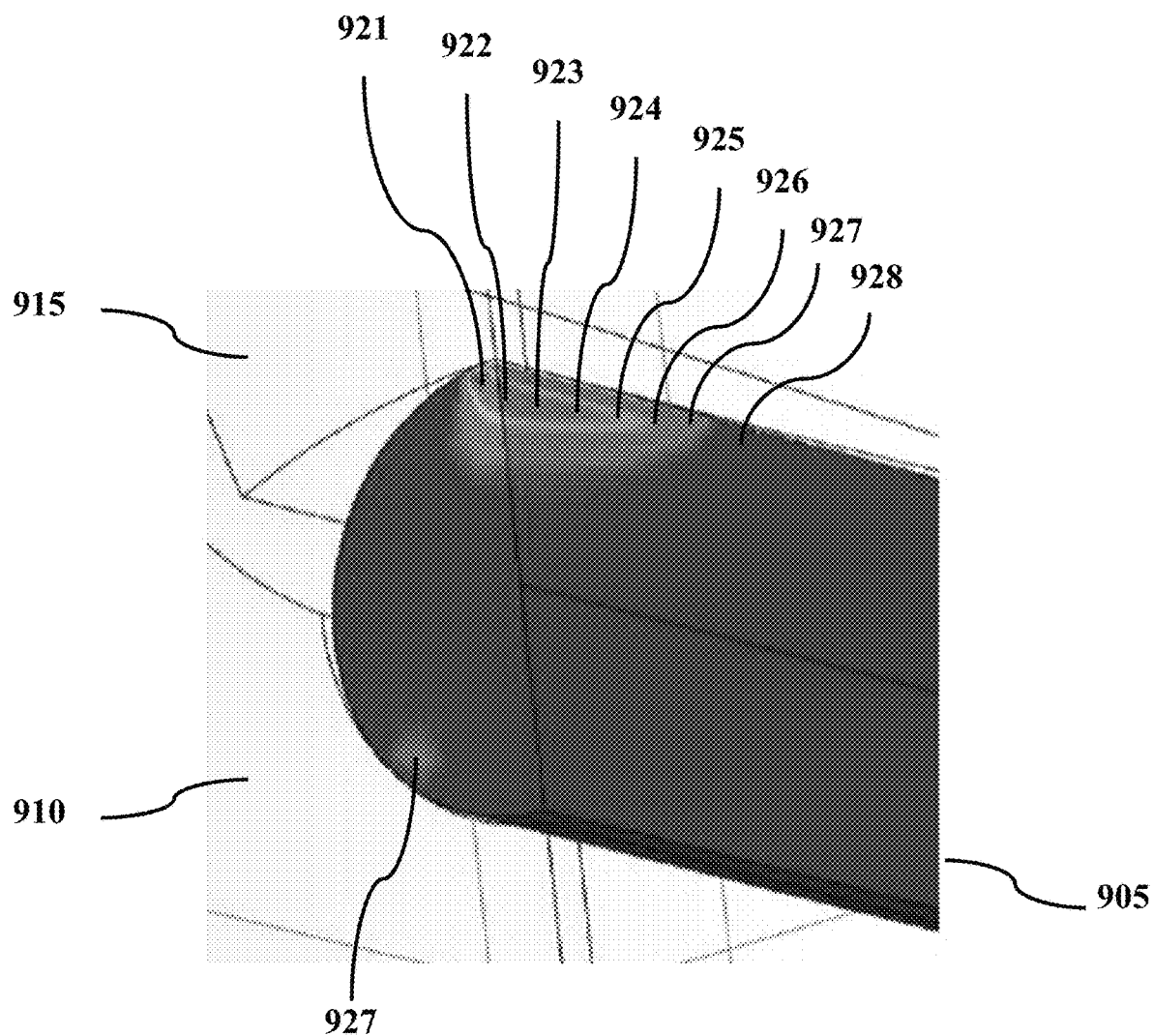
FIG. 9A-9B illustrate a surface plot and a graph of the stress experienced by a wire feeding assembly during wire feeding.

FIG. 9A schematically illustrates a partial, sagittal cross-sectional view of a wire 905 that is in contact with a concave groove driver roller 910 and a preload roller 915. The wire 905 is an aluminum wire. A radius of curvature of a surface of the preload roller is greater than a radius of curvature of the wire, while a radius of curvature of the concave groove of the driver roller is substantially the same as the radius of curvature of the wire. The wire 905 is presented as a surface plot showing the magnitude of stress on the wire when a force of about 3 Newton (N) is applied by the preload roller 915. The force of 3 N may be the force required to direct the wire to a print head during printing at least a portion of a 3D object. In the surface plot, the magnitudes of the stress (921, 922, 923, 924, 925, 926, 927, and 928) are presented in a decreasing manner from 921 to 928. The surface plot predicts that the exerted stress on the wire may be greater at a contact surface between the preload roller and the wire than at a contact surface between the driver roller and the wire. The differences in the exerted stress between the two contact surfaces may be due to the difference between the radii of curvature of the surface of the preload roller and the groove of the driver roller. However, the surface plot predicts that the overall exerted stress on the wire by the assembly comprising the concave groove driver roller and the preload roller is localized and does not severely deform the wire.

Figure 9B:
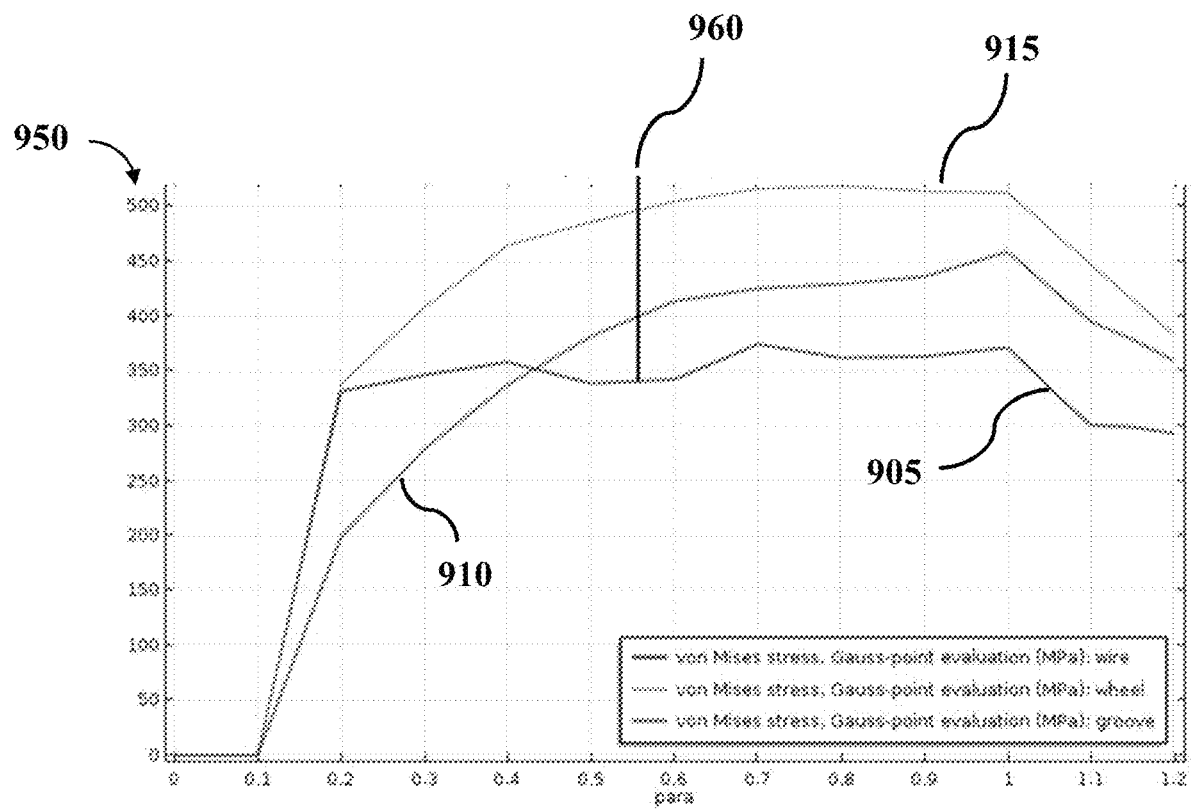

FIG. 9B shows a plot 950 of the von Mises stress experienced by the aluminum wire 905, the driver roller 910, and the preload roller 915 under strain. During simulation, a displacement of 2.5 μm is represented as a unit of 1. In the wire 905, a 2.5 μm displacement equals to a strain of 1%. Under the exerted force of 3 N by the preload roller (indicated by 960), the stresses experienced by the preload roller 915, the driver roller 910, and the aluminum wire 905 are predicted to be about 500 megapascal (MPa), 400 MPa, and 340 MPa, respectively. The stresses experienced by the preload roller 915 and the driver roller 910 are below the yield strength ($\sigma_y$) of the material (440C steel; $\sigma_y$=1900 mPa). The stress experienced by the aluminum wire 905 is comparable to the yield strength ($\sigma_y$) of the material (310 mPa). Thus, under the working force of 3 N, the preload roller 915 and the driver roller 910 in the assembly do not experience enough stress to deform plastically, and may be used without being replaced frequently.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for printing a three-dimensional (3D) object, comprising:
    a wire source configured to hold a wire usable for said printing said 3D object;
    a print head comprising a guide configured to direct said wire towards and in contact with a support or at least a portion of said 3D object adjacent to said support;
    a driver roller comprising a groove that is configured to (i) accept at least a portion of said wire and (ii) direct said at least said portion of said wire towards said guide;

wherein said groove has a concave shape comprising at least two sides having a radius of curvature, wherein said radius of curvature deviates from a radius of curvature of said wire by at most 50%,
wherein said concave shape of said groove comprises a width and a depth wherein said width is different than said depth,
wherein said concave shape comprises a vertex section between said at least two sides of said concave shape,
wherein said groove further comprises an opening comprising at least two walls adjacent to said at least two sides of said concave shape;
a power source in electrical communication with said wire and said support, wherein said power source is configured to supply electrical current from said guide through said wire and to said support, or vice versa, to melt said wire when said wire is in contact with said support or said at least said portion of said 3D object during said printing of said 3D object; and
a controller in communication with said power source, wherein said controller is configured to direct said power source to supply said electrical current from said guide through said wire and to said support, or vice versa.

2. The system of claim 1, wherein said driver roller comprises at least one additional groove adjacent to said groove.

3. The system of claim 2, wherein said driver roller comprises a position adjusting mechanism to move said driver roller into alignment with said wire, wherein said movement of said driver roller is along a rotational axis of said driver roller.

4. The system of claim 1, wherein said driver roller is connected to an electric motor for rotating said driver roller at a plurality of operating speeds.

5. The system of claim 1, wherein said driver roller further comprises at least one additional groove coupled to said groove.

6. The system of claim 5, wherein said groove and said at least one additional groove have different radii or curvature.

7. The system of claim 1, further comprising an assembly for directing said wire towards said guide, wherein said assembly comprises said driver roller and an additional roller, wherein said additional roller is configured to (i) contact at least a portion of said wire and (ii) direct said at least said portion of said wire into said groove of said driver roller of said assembly.

8. The system of claim 7, further comprising a buffer idler disposed between said wire source and said assembly, wherein said buffer idler is configured to (i) contact at least a portion of said wire and (ii) direct said at least said portion of said wire towards said assembly.

9. The system of claim 1, further comprising a wire merger comprising at least one entry orifice and an exit orifice, wherein said wire merger is configured to (i) receive said wire from said driver roller via said entry orifice and direct said wire towards said guide via said exit orifice, or (ii) receive said wire from said wire source via said entry orifice and direct said wire towards said driver roller via said exit orifice.

10. The system of claim 9, wherein said wire merger is configured to receive at least one additional wire from at least one additional wire source.

11. The system of claim 9, further comprising a conduit for providing a continuous passageway for said wire to said at least one entry orifice or said wire merger.

12. The system of claim 9, wherein said wire merger comprises a converging configuration to provide a path for said wire from said at least one entry orifice to said exit orifice.

13. The system of claim 1, wherein said wire is selected from the group consisting of steel, stainless steel, iron, chromium, nickel, titanium, platinum, palladium, aluminum, and any combination thereof.

14. A method for printing a three-dimensional (3D) object, comprising:
(a) activating a 3D printing system, comprising:
   i. a wire source configured to hold a wire usable for said printing said 3D object;
   ii. a print head comprising a guide configured to direct said wire towards and in contact with a support or at least a portion of said 3D object adjacent to said support;
   iii. a driver roller comprising a groove that is configured to (i) accept at least a portion of said wire and (ii) direct said at least said portion of said wire towards said guide, wherein said groove has a concave shape comprising at least two sides having a radius of curvature, wherein said radius of curvature deviates from a radius of curvature of said wire by at most 50%, wherein said concave shape of said groove comprises a width and a depth wherein said width is different than said depth, wherein said concave shape comprises a vertex section between said at least two sides of said concave shape, wherein said groove further comprises an opening comprising at least two walls adjacent to said at least two sides of said concave shape; and
   iv. a power source in electrical communication with said wire and said support, wherein said power source is configured to supply electrical current from said guide through said wire and to said support during said printing;
(b) using said driver roller to direct said at least said portion of said wire towards said guide; and
(c) directing said power source to supply said electrical current from said guide through said wire and to said support under conditions sufficient to melt said wire when said wire is in contact with said support or said at least said portion of said 3D object.

15. The method of claim 14, further comprising detecting when said wire is in contact with said support or said at least said portion of said 3D object adjacent to said support, and directing said power source to supply said electrical current from said guide through said wire and to said support or said at least said portion of said 3D object adjacent to said support, or vice versa, when said wire is detected to be in contact with said support or said at least said portion of said 3D object.

16. The method of claim 14, further comprising adjusting a force of contact between said wire and said support or said at least said portion of said 3D object adjacent to said support.

17. The method of claim 14, wherein said driver roller is connected to an electric motor, further comprising accelerating, decelerating, maintaining at a given speed of a plurality of operating speeds, or controlling direction of rotation of said electric motor, wherein said adjustment of said driver roller is along a rotational axis of said driver roller.

18. The method of claim 14, wherein said driver roller further comprises at least one additional groove coupled to said groove.

19. The method of claim 18, wherein said groove and said at least one additional groove have different radii or curvature.

20. The method of claim 14, wherein said wire is selected from the group consisting of steel, stainless steel, iron, chromium, nickel, titanium, platinum, palladium, aluminum, and any combination thereof.

* * * * *